United States Patent
Kim et al.

(10) Patent No.: US 10,841,812 B2
(45) Date of Patent: Nov. 17, 2020

(54) METHOD FOR RECEIVING REFERENCE SIGNAL AND ELECTRONIC DEVICE THEREFOR

(71) Applicant: Samsung Electronics Co., Ltd., Suwon-si, Gyeonggi-do (KR)

(72) Inventors: Taeyoon Kim, Suwon-si (KR); Hyoungjoo Lee, Suwon-si (KR); Junyoung Woo, Suwon-si (KR); Chaiman Lim, Suwon-si (KR); Sungchul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/684,892

(22) Filed: Nov. 15, 2019

(65) Prior Publication Data

US 2020/0162939 A1    May 21, 2020

(30) Foreign Application Priority Data

Nov. 16, 2018  (KR) ........................ 10-2018-0141329

(51) Int. Cl.
*H04W 16/28* (2009.01)
*H04W 56/00* (2009.01)
*H04W 68/00* (2009.01)

(52) U.S. Cl.
CPC ......... *H04W 16/28* (2013.01); *H04W 56/001* (2013.01); *H04W 68/005* (2013.01)

(58) Field of Classification Search
CPC . H04W 16/28; H04W 56/001; H04W 68/005; H04W 56/0015; H04W 72/046;
(Continued)

(56) References Cited

U.S. PATENT DOCUMENTS 10,080,218 B2    9/2018    Yi et al.
10,512,008 B2    12/2019   Deenoo et al.
(Continued)

FOREIGN PATENT DOCUMENTS

KR    10-2016-0130429 A    11/2016
WO    2015109153 A1    7/2015
WO    2018172996 A1    9/2018

OTHER PUBLICATIONS

International Search Report in connection with International Application No. PCT/KR2019/015528 dated Mar. 16, 2020, 3 pages.
(Continued)

*Primary Examiner* — Andrew Wendell

(57) ABSTRACT

An electronic device may receive discontinuous reception (DRX) cycle information from a first cell, may receive synchronization signal block measurement timing information including synchronization signal block measurement window information and synchronization signal block measurement period information, and may receive at least part of a first synchronization signal block from the first cell and at least part of a second synchronization signal block from a second cell neighboring the first cell, at a period indicated by the DRX cycle information based on the synchronization signal block measurement timing information. When reception timing of the first synchronization signal block and reception timing of the second synchronization signal block is less than a specified time duration, the device may receive the at least part of the first synchronization signal block in a first measurement window, and may receive the at least part of the second synchronization signal block within a second measurement window.

20 Claims, 14 Drawing Sheets

(58) Field of Classification Search
CPC ..... H04W 24/02; H04B 7/0617; H04B 7/043;
H04B 7/0695; H04B 7/086; H04B 7/088;
H04B 7/0897; H04B 17/11; H04B 17/21
See application file for complete search history.

(56) References Cited

U.S. PATENT DOCUMENTS

| | | | |
|---|---|---|---|
| 2016/0047884 A1* | 2/2016 | Zhang | H04B 7/0617 342/458 |
| 2016/0337916 A1 | 11/2016 | Deenoo et al. | |
| 2017/0094624 A1* | 3/2017 | Balachandran | H04W 56/0015 |
| 2017/0223667 A1 | 8/2017 | Yi et al. | |
| 2018/0077680 A1 | 3/2018 | Tenny et al. | |
| 2018/0324758 A1 | 11/2018 | Tenny et al. | |
| 2019/0007933 A1 | 1/2019 | Yi et al. | |
| 2019/0069256 A1* | 2/2019 | Jung | H04W 56/0015 |
| 2019/0110300 A1* | 4/2019 | Chen | H04W 74/04 |
| 2019/0150110 A1* | 5/2019 | Ko | H04W 72/04 370/350 |
| 2019/0207667 A1* | 7/2019 | Zhou | H04B 7/088 |
| 2019/0268813 A1 | 8/2019 | Ramachandra et al. | |
| 2019/0363809 A1* | 11/2019 | Yoon | H04W 56/00 |
| 2019/0386757 A1* | 12/2019 | Li | H04B 7/0626 |
| 2019/0394749 A1* | 12/2019 | Islam | H04W 72/042 |
| 2020/0146095 A1* | 5/2020 | Hsieh | H04W 76/28 |
| 2020/0154446 A1* | 5/2020 | Yerramalli | H04W 72/085 |
| 2020/0162182 A1* | 5/2020 | Zhang | H04J 11/0076 |
| 2020/0163037 A1* | 5/2020 | Zheng | H04W 56/00 |
| 2020/0187185 A1* | 6/2020 | Zhu | H04W 56/0015 |
| 2020/0205149 A1* | 6/2020 | Khoshnevisan | H04L 1/1887 |

OTHER PUBLICATIONS

European Search Report in connection with European Application No. 19209208.8 dated Feb. 28, 2020, 10 pages.
Ericsson, "RRM aspects of NR UE power saving," R1-1813184, 3GPP WG1 Meeting #94bis, Spokane, USA, Nov. 12-16, 2018, 5 pages.
Samsung, "UE power consumption reduction in RRM measurement," R1-1813013, 3GPP TSG RAN WG1 Meeting #95, Spokane, USA, Nov. 12-16, 2018, 5 pages.

* cited by examiner

METHOD FOR RECEIVING REFERENCE SIGNAL AND ELECTRONIC DEVICE THEREFOR

CROSS-REFERENCE TO RELATED APPLICATIONS

This application is based on and claims priority under 35 U.S.C. § 119 to Korean Patent Application No. 10-2018-0141329, filed on Nov. 16, 2018, in the Korean Intellectual Property Office, the disclosure of which is incorporated by reference herein its entirety.

BACKGROUND

1. Field

The disclosure relates to a method of receiving and measuring a reference signal and an electronic device performing the same.

2. Description of Related Art

An electronic device may support cellular communication. For example, the cellular communication may use a wireless protocol according to a communication standard specified by $3^{rd}$ generation partnership project (3GPP). With the development of the communication standard, the range of a frequency band used by the electronic device is increasing. For example, in the 5G mobile communication, the electronic device may increase the data transfer rate, using mmWave (e.g., the signal in a frequency band of 6 GHz or above).

A base station may include an array antenna supporting beamforming. The base station may generate a plurality of beams facing a horizontal and/or vertical direction, using an array antenna. The electronic device supporting the 5G mobile communication may use a beamforming technology to transmit and/or receive signals. Because both of a transmitting end and a receiving end support beamforming, the electronic device may determine the combination (or beam pair) of a beam of a base station and a beam of an electronic device, which may represent an optimal link performance. For example, the electronic device may determine the combination of beams through a beam tracking procedure. User equipment may measure a reference signal from an associated cell, using the determined combination of beams.

The above information is presented as background information only to assist with an understanding of the disclosure. No determination has been made, and no assertion is made, as to whether any of the above might be applicable as prior art with regard to the disclosure.

SUMMARY

In a cellular mobile communication, an electronic device may periodically measure (e.g., measure the strength of a reference signal) a cell, even in a radio resource control (RRC) idle state. The electronic device may perform cell measurement depending on the discontinuous reception (DRX) cycle to reduce power consumption. For example, the electronic device may transition from the idle state of the electronic device to a wake-up state in a partial duration of the DRX cycle and then the electronic device may receive a reference signal from a cell.

In the 5G mobile communication, the electronic device may apply a beamforming vector to measure a reference signal. When measuring the reference signal for a plurality of cells, the electronic device may receive the reference signal, using the beamforming vector associated with each cell. Accordingly, even though a serving cell and a neighbor cell use the same frequency band (e.g., in the case of intra-frequency), the electronic device may fail to measure the reference signals of the serving cell and the neighbor cell at the same timing. In this case, the electronic device may maintain the wake-up state to measure the neighbor cell. Accordingly, the time required to measure the cell of the electronic device may increase or the consumption of current may increase.

In various embodiments of the specification, the electronic device may reduce the power consumption for measuring a cell.

Aspects of the disclosure are to address at least the above-mentioned problems and/or disadvantages and to provide at least the advantages described below.

In accordance with an aspect of the disclosure, an electronic device may include a memory, at least one communication device performing beamforming, and at least one processor operatively connected to the memory and the at least one communication device. The at least one processor may be configured to receive discontinuous reception (DRX) cycle information from a first cell, to receive synchronization signal block measurement timing information including synchronization signal block measurement window information and synchronization signal block measurement period information, to receive at least part of a first synchronization signal block from the first cell and at least part of a second synchronization signal block from a second cell neighboring the first cell, at a period indicated by the DRX cycle information based on the synchronization signal block measurement timing information, and, when a difference between reception timing of the first synchronization signal block and reception timing of the second synchronization signal block is less than a specified time duration, to receive the at least part of the first synchronization signal block in a first measurement window and receive the at least part of the second synchronization signal block within a second measurement window following the first measurement window. A length of each of the first measurement window and the second measurement window is not greater than a window time duration indicated by the synchronization signal block measurement window information, and an interval between the first measurement window and the second measurement window is not less than a period indicated by the synchronization signal block measurement period information.

In accordance with another aspect of the disclosure, a beam tracking method of an electronic device may include receiving DRX cycle information from a first cell, receiving synchronization signal block measurement timing information including synchronization signal block measurement window information and synchronization signal block measurement period information, and receiving at least part of a first synchronization signal block from the first cell and at least part of a second synchronization signal block from a second cell neighboring the first cell, at a period indicated by the DRX cycle information based on the synchronization signal block measurement timing information, using a communication circuit of the electronic device.

In accordance with another aspect of the disclosure, an electronic device may include housing, an antenna array positioned inside the housing or including antenna elements formed in a part of the housing, a processor electrically or operatively connected to the antenna array and forming a directional beam, using the antenna array, and a memory operatively connected to the processor. The memory may store instructions that, when executed, cause the processor to select a serving cell through a directional beam formed in a first direction, during a first wake-up time of the processor, to receive time configuration information including a period for measuring strength of a signal of each of the serving cell and a first neighbor cell associated with the serving cell, from the serving cell, to set first periods of time for measurement of a first synchronization signal block transmitted by the serving cell and second periods of time, which at least partly overlap with the first periods of time, for measurement of a second synchronization signal block transmitted by the first neighbor cell, based at least partly on the time configuration information, after the first wake-up time, to form a directional beam in the first direction during one of the first periods of time in a second wake-up time of the processor to measure strength of a signal received from the serving cell, and after the second wake-up time, to form a directional beam in a second direction different from the first direction during one of the second periods of time in a third wake-up time of the processor to measure a signal received from the first neighbor cell.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Below, various embodiments of the disclosure may be described with reference to accompanying drawings. The embodiments and terms used with regard to the embodiments are not intended to limit the technology described herein to specific embodiments, and should be understood to include various modifications, equivalents, and/or alternatives of the embodiments.

Figure 1:
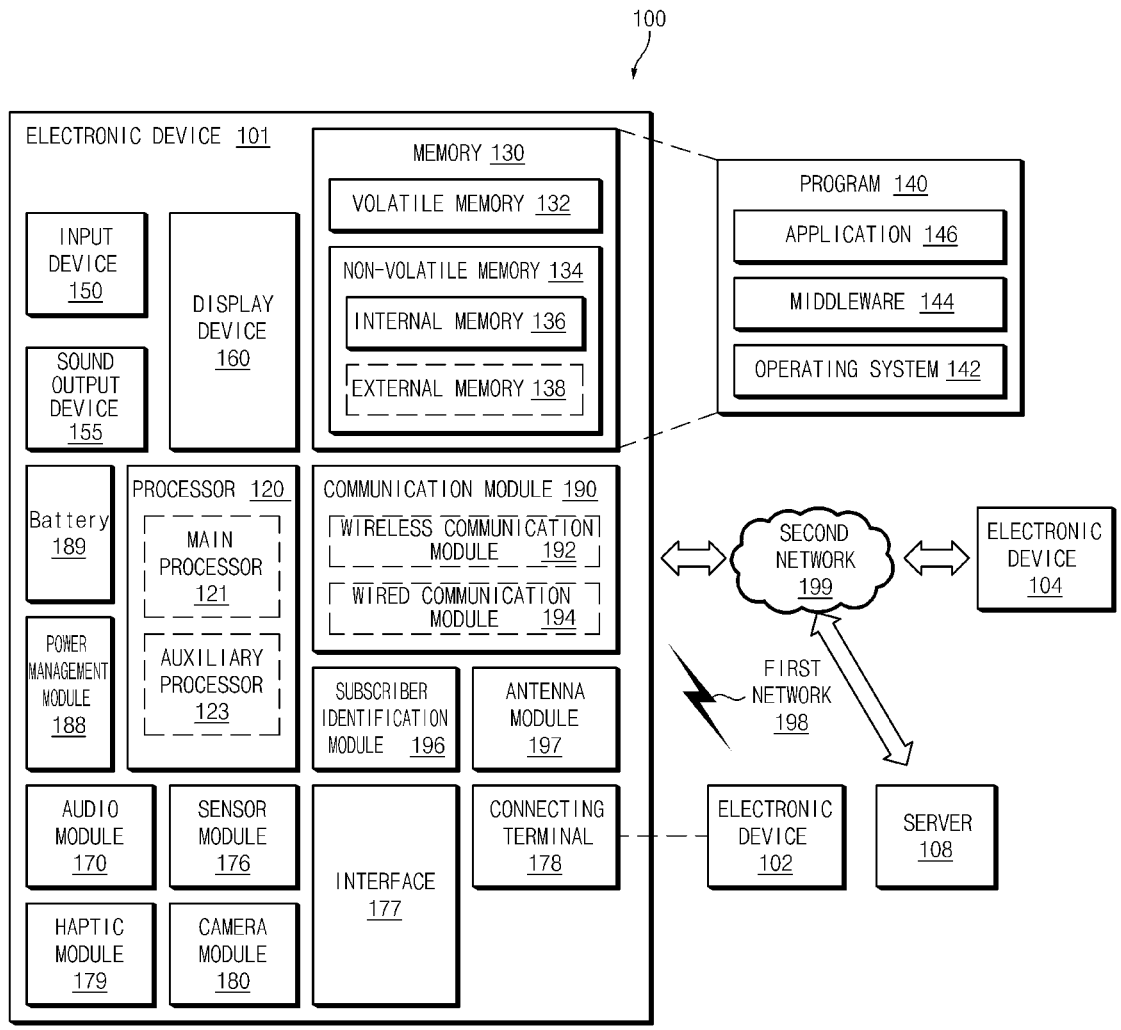
FIG. 1 illustrates a block diagram of the electronic device in a network, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various embodiments to be described below, the operations of the electronic device 101 may be performed by the processor 120. For example, the processor 120 may control the operations of the electronic device 101 based on instructions stored in the memory 130.

Figure 2:
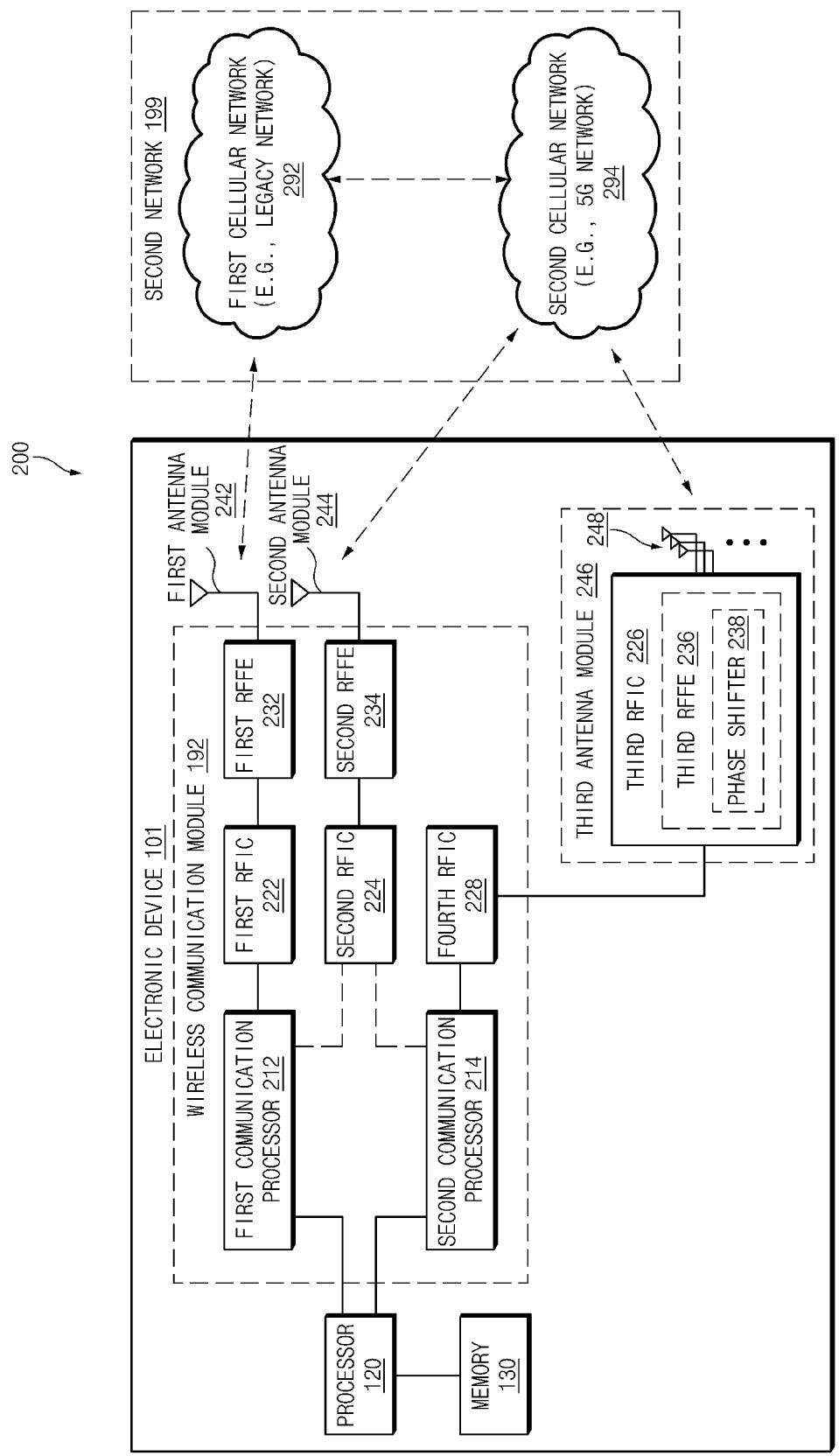
FIG. 2 illustrates a block diagram of an electronic device in a network environment including a plurality of cellular networks, according to various embodiments.

FIG. 2 illustrates a block diagram 200 of the electronic device 101 in a network environment including a plurality of cellular networks, according to various embodiments.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one of the components described in FIG. 1, and the second network 199 may include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or included as the part of the third RFIC 226.

The first communication processor 212 may support the establishment of a communication channel of a band to be used for wireless communication with the first cellular network 292 and the legacy network communication through the established communication channel. According to various embodiments, the first cellular network may be a legacy network including a 2nd generation (2G), 3G, 4G, or long term evolution (LTE) network. The second communication processor 214 may support the establishment of a communication channel corresponding to a specified band (e.g., about 6 GHz-about 60 GHz) among bands to be used for wireless communication with the second cellular network 294 and 5G network communication via the established communication channel. According to various embodiments, the second cellular network 294 may be 5G network defined in 3GPP. Additionally, according to an embodiment, the first communication processor 212 or the second communication processor 214 may support the establishment of a communication channel corresponding to another specified band (e.g., about 6 GHz or less) among bands to be used for wireless communication with the second cellular network 294 and 5G network communication via the established communication channel. According to an embodiment, the first communication processor 212 and the second communication processor 214 may be implemented within a single chip or a single package. According to various embodiments, the first communication processor 212 or the second communication processor 214 may be implemented within a single chip or a single package together with the processor 120, the auxiliary processor 123, or the communication module 190.

At the time of transmission, the first RFIC 222 may convert a baseband signal generated by the first communication processor 212 to a radio frequency (RF) signal of about 700 MHz to about 3 GHz used for the first cellular network 292 (e.g., a legacy network). At the time of reception, the RF signal may be obtained from the first cellular network 292 (e.g., a legacy network) via an antenna (e.g., the first antenna module 242) and may be preprocessed via RFFE (e.g., the first RFFE 232). The first RFIC 222 may convert the preprocessed RF signal to a baseband signal so as to be processed by the first communication processor 212.

At the time of transmission, the second RFIC 224 may convert a baseband signal generated by the first communication processor 212 or the second communication processor 214, to an RF signal (hereinafter referred to as a "5G Sub6 RF signal") of a Sub6 band (e.g., about 6 GHz or less) used for the second cellular network 294 (e.g., 5G network). At the time of reception, the 5G Sub6 RF signal may be obtained from the second cellular network 294 (e.g., 5G network) via an antenna (e.g., the second antenna module 244) and may be preprocessed via RFFE (e.g., the second RFFE 234). The second RFIC 224 may convert the preprocessed 5G Sub6 RF signal to a baseband signal so as to be processed by a communication processor corresponding to some of the first communication processor 212 or the second communication processor 214.

At the time of transmission, the third RFIC 226 may convert a baseband signal generated by the second communication processor 214, to an RF signal (hereinafter referred to as a "5G Above6 RF signal") of a 5G Above6 band (e.g., about 6 GHz-about 60 GHz) to be used for the second cellular network 294 (e.g., 5G network). At the time of reception, the 5G Above6 RF signal may be obtained from the second cellular network 294 (e.g., 5G network) via an antenna (e.g., the antenna 248) and may be preprocessed via a third RFFE 236. The third RFIC 226 may convert the preprocessed 5G Above6 RF signal to a baseband signal so as to be processed by the second communication processor 214. According to an embodiment, the third RFFE 236 may be formed as the part of the third RFIC 226.

According to an embodiment, the electronic device 101 may include the fourth RFIC 228 independent of the third RFIC 226 or as at least part thereof. In this case, the fourth RFIC 228 may convert a baseband signal generated by the second communication processor 214 into an RF signal (hereinafter referred to as an "IF signal") in an intermediate frequency band (e.g., ranging from about 9 GHz to about 11 GHz) and may provide the IF signal to the third RFIC 226. The third RFIC 226 may convert the IF signal to the 5G Above6 RF signal. At the time of reception, the 5G Above6 RF signal may be received from the second cellular network 294 (e.g., 5G network) via an antenna (e.g., the antenna 248) and may be converted to the IF signal by the third RFIC 226. The fourth RFIC 228 may convert the IF signal to the baseband signal such that the second communication processor 214 is capable of processing the baseband signal.

According to an embodiment, the first RFIC 222 and the second RFIC 224 may be implemented as at least part of a single chip or a single package. According to an embodiment, the first RFFE 232 and the second RFFE 234 may be implemented as at least part of a single chip or a single package. According to an embodiment, at least one antenna module of the first antenna module 242 or the second antenna module 244 may be omitted or may be coupled to another antenna module and then may process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., a bottom surface) of a second substrate (e.g., sub PCB) separately of the first substrate and the antenna 248 may be disposed in another partial region (e.g., an upper surface), and thus the third antenna module 246 may be formed. It is possible to reduce the length of the transmission line between the third RFIC 226 and the antenna 248 by positioning the third RFIC 226 and the antenna 248 on the same substrate. Accordingly, the signal of the high-frequency band (e.g., about 6 GHz to about 60 GHz) used for 5G network communication may be prevented from being lost (e.g., attenuated) by the transmission line. For this reason, the electronic device 101 may improve the quality or speed of communication with the second cellular network 294 (e.g., 5G network).

According to an embodiment, the antenna 248 may be formed as an antenna array including a plurality of antenna elements capable of being used for beamforming. In this case, the third RFIC 226 may be, for example, a part of a third RFFE 236 may include a plurality of phase shifters 238 corresponding to a plurality of antenna elements. In transmission, each of the plurality of phase shifters 238 may convert the phase of 5G Above6 RF signal transmitted to the outside (e.g., the base station of 5G network) of the electronic device 101 via the corresponding antenna element. In reception, each of the plurality of phase shifters 238 may convert the phase of 5G Above 6 RF signal, which is received from the outside via the corresponding antenna element, to the same or substantially similar phase. This makes it possible to transmit or receive a signal between the electronic device 101 and the outside via the beamforming.

The second cellular network 294 (e.g., 5G network) may be operated (e.g., Stand-Alone (SA)) independently of the first cellular network 292 (e.g., legacy network) or may be operated (e.g., Non-Stand Alone (NSA)) while being connected to the first cellular network 292. For example, the 5G network may include only an access network (e.g., 5G radio access network (RAN) or next generation RAN (NG RAN)) but may not include a core network (e.g., next generation core (NGC)). In this case, after the electronic device 101 accesses the access network of the 5G network, the electronic device 101 may access an external network (e.g., Internet) under the control of the core network (e.g., evolved packed core (EPC)) of the legacy network. Protocol information (e.g., LTE protocol information) for communication with the legacy network or protocol information (e.g., New Radio NR protocol information) for communication with the 5G network may be stored in the memory 130 so as to be accessed by another component (e.g., the processor 120, the first communication processor 212, or the second communication processor 214).

Figure 3:
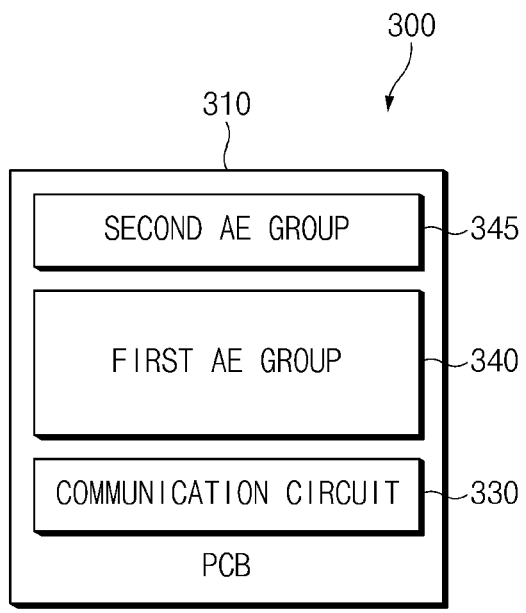
FIG. 3 illustrates a block diagram of an antenna module, according to various embodiments.

FIG. 3 illustrates a block diagram of an antenna module 300, according to various embodiments.

Referring to FIG. 3, the antenna module 300 (e.g., the third antenna module 246 of FIG. 2) may include a communication circuit 330 (e.g., RFIC) disposed on a printed circuit board (PCB) 310, the PCB 310, and at least one antenna element (AE) group (e.g., a first AE group 340 or a second AE group 345). For example, the first AE group 340 and the second AE group 345 may be referred to as a first antenna array and a second antenna array. For example, each antenna element (e.g., conductive plate) included in the first AE group 340 and/or the second AE group 345 may be referred to as a single omni-directional antenna. For example, when at least part of antenna elements included in the first AE group 340 and/or the second AE group 345 is simultaneously used for a beamforming operation, at least part of antenna elements used for the beamforming operation may operate as a single array antenna. In this case, the array antenna may form a beam facing at least one specified direction.

Figure 9:
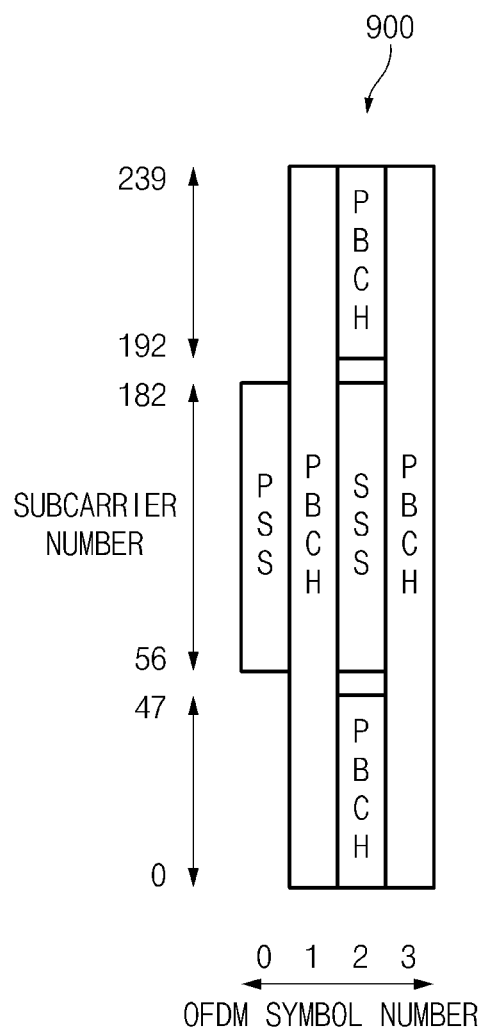
FIG. 9 illustrates a resource mapping structure of a synchronization signal block according to various embodiments.

According to an embodiment, the first AE group 340 or the second AE group 345 may be positioned on the first surface of the PCB 310; the communication circuit 330 may be positioned on the second surface of the PCB 310. The PCB 310 may include a coaxial cable connector or a board to board (B-to-B) connector for electrical connection with any other PCB (e.g., a PCB on which the wireless communication module 192 of FIG. 9 is positioned) by using a transmission line. The PCB 310 may be connected with the PCB on which the wireless communication module 192 is positioned, for example, using a coaxial cable, and the coaxial cable may be used to transfer a transmit/receive IF or RF signal. For another example, a power or any other control signal may be transferred through the B-to-B connector.

According to an embodiment, the first AE group 340 and/or the second AE group 345 may include a plurality of conductive plates (e.g., antenna elements). Each of the plurality of antenna elements may corresponds to a patch antenna, a shorted patch antenna, a loop antenna, or a dipole antenna. According to an embodiment, the plurality of antenna elements belonging to the first AE group 340 may form a single array antenna. For example, the antenna module 300 may perform beamforming using the antenna elements of the first AE group 340. According to an embodiment, a plurality of antenna elements belonging to the second AE group 345 may form a single array antenna. For example, the antenna module 300 may perform beamforming using the antenna elements (e.g., a patch antenna) of the second AE group 345. According to an embodiment, the antenna module 300 may perform beamforming, using the antenna elements of the first AE group 340 and the second AE group 345. According to an embodiment, each of antenna elements belonging to the second AE group 345 may operate as a single antenna. For example, the antenna elements included in the second AE group 345 may be a dipole antenna.

Figure 4:
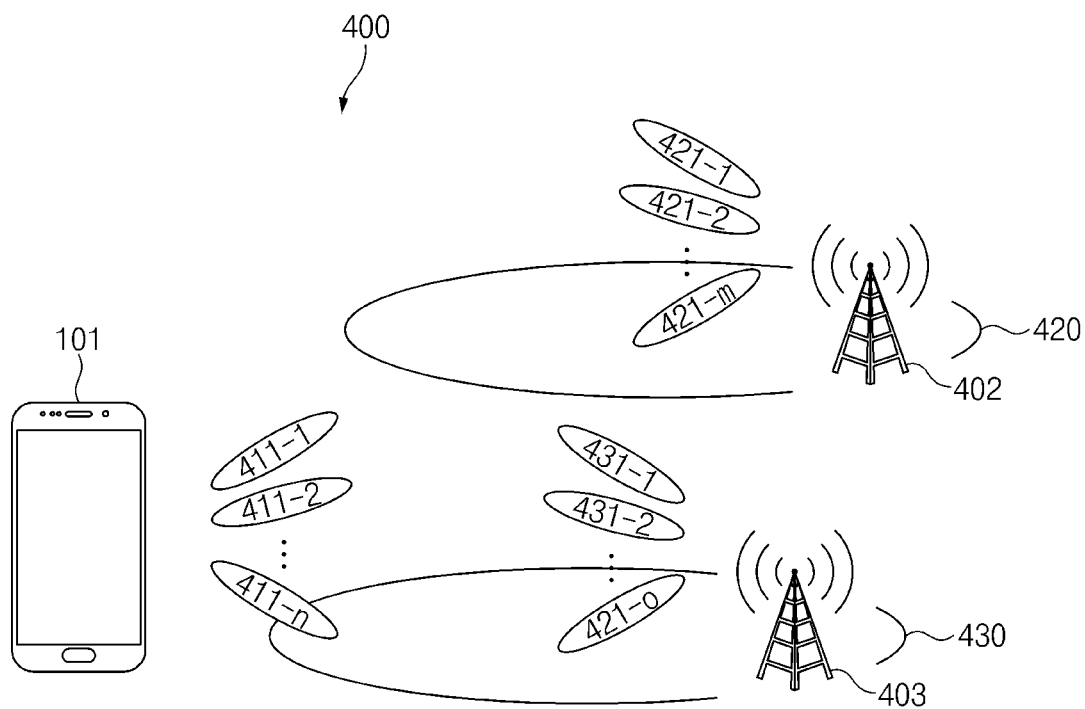
FIG. 4 illustrates a cell measurement environment of an electronic device, according to an embodiment.

FIG. 4 illustrates a cell measurement environment 400 of the electronic device 101, according to an embodiment.

According to various embodiments, the cell measurement environment 400 may include a first external electronic device 402, a second external electronic device 403, and the electronic device 101. For example, the first external electronic device 402 and the second external electronic device 403 may be a base station (e.g., next generation NodeB (gNB)) supporting the 5G mobile communication. For example, the electronic device 101 may be user equipment (UE) capable of performing beamforming. According to an embodiment, the first external electronic device 402 may be a base station associated with a first cell 420 and may transmit a signal, using at least one beam of 'M' beams (e.g., 421-1, 421-2, . . . , and 421-$m$). According to an embodiment, the second external electronic device 403 may be a base station associated with a second cell 430 and may transmit a signal, using at least one beam of 'O' beams (e.g., 431-1, 431-2, . . . , and 431-$o$). According to an embodiment, the electronic device 101 may receive a signal, using at least one beam of 'N' beams 411-1, 411-2, . . . , and 411-N. For example, the electronic device 101 may form a reception beam by applying the specified phase and/or amplification to each of conductive plates of an antenna module (e.g., the antenna module 300 of FIG. 3). An embodiment is exemplified in FIG. 4 as the first cell 420 and the second cell 430 are cells associated with different base stations. However, the first cell 420 and the second cell 430 may be cells associated with the same base station. The first cell 420 and the second cell 430 may have the relationship of intra-frequency or inter-frequency.

According to various embodiments, the first external electronic device 402 and/or the second external electronic device 403 may transmit (or broadcast) a synchronization signal (SS) burst (e.g., the electronic device 101) depending on the specified period and timing. For example, the SS burst may include a plurality of SS blocks (SSBs). Each of the SSBs included in a single SS burst may correspond to different beams, respectively. For example, each of the SSBs included in the SS burst received from the first external electronic device 402 may correspond to the plurality of beams 421-1, 421-2, . . . , and 421-$m$. For example, the SSB may include the identifier (e.g., an SSB index) of a beam corresponding to a synchronization signal and/or the identifier of the related cell (e.g., a first cell). Each of the SSBs may include a primary synchronization signal (PSS), a secondary synchronization signal (SSS), and a physical broadcasting channel (PBCH). The SSBs included in the SS burst may have different indexes, respectively. The transmission of the SSBs may be referred to "beam sweeping". According to an embodiment, the SSBs may be transmitted in the SS burst at a specified period.

According to various embodiments, the electronic device 101 may determine a transmission beam and a reception beam through beam tracking. For example, the electronic device 101 may determine the combination (e.g., beam pair) of a single reception beam among 'N' reception beams 411-1, 411-2, . . . , and 411-$n$ and a single transmission beam among 'M' transmission beams and/or the combination (e.g., beam pair) of a single reception beam among 'N' reception beams and a single transmission beam among 'O' transmission beams, by receiving beams (e.g., SSBs corresponding to 'M' transmission beams 421-1, 421-2, . . . and 421-M and 'O' transmission beams 431-1, 431-2, . . . , and 431-0) received using each of 'N' reception beams 411-1, 411-2, . . . , and 411-n. For example, the electronic device 101 may transmit information (e.g., the SSB index of a beam index or a synchronization beam) of the determined transmission beam, to the first cell 420 and/or the second cell 430.

According to various embodiments, when the electronic device 101 is in an RRC idle and/or an RRC inactive state, the electronic device 101 may periodically perform cell measurement. For example, the first cell 420 may be the serving cell of the electronic device 101. According to an embodiment, the electronic device 101 may receive paging cycle information (e.g., DRX cycle information) from the first cell 420. The electronic device 101 may perform cell measurement based on the paging cycle information received from the first cell 420. For example, the electronic device 101 may receive the paging cycle information from the first cell 420. For example, the electronic device 101 may receive a signal (e.g., RRC signaling) including the paging cycle information from the first cell 420.

According to various embodiments, the electronic device 101 may perform cell measurement based on the paging cycle information. For example, the electronic device 101 may perform cell measurement during at least part of time duration of a paging cycle every paging cycle. According to an embodiment, the electronic device 101 may measure a serving cell (e.g., the first cell 420) and the neighbor cells (e.g., the second cell 430). An embodiment is exemplified in FIG. 4 as only the single neighbor cell (e.g., the second cell 430) is illustrated. However, embodiments of the disclosure are not limited thereto. For example, the electronic device 101 may perform cell measurement on the serving cell and the plurality of neighbor cells.

According to an embodiment, the electronic device 101 may operate in a second state during at least part of the DRX duration by a paging cycle (e.g., DRX cycle). For example, the electronic device 101 may transition from the first state to the second state for the cell measurement and then may perform the cell measurement. For example, the second state may mean a state where the power consumption of the communication module (e.g., the wireless communication module 192 and/or the third antenna module 246 of FIG. 2) of the electronic device 101 higher than the power consumption in the first state. For example, the second state may correspond to an active or wake-up state; the first state may correspond to an inactive of the electronic device 101 or the idle state of the electronic device 101.

According to various embodiments, the electronic device 101 may perform cell measurement, using the beamforming (e.g., the beamforming vector corresponding to the reception beam of the beam combination selected for each cell) of the reception beam associated with each cell. For example, the electronic device 101 may perform cell measurement on the first cell 420, using a first beam 411-1; the electronic device 101 may perform cell measurement on the second cell 430, using a second beam 411-2. When beams associated with the first cell 420 and the second cell 430 are different from each other, the reconfiguration of at least one of the communication module (e.g., the third antenna module 246 of FIG. 2) may be required to apply the beamforming. For example, the electronic device 101 may fail to perform the measurement associated with the first cell 420 and the second cell 430. For example, the electronic device 101 may perform the cell measurement on the first cell 420 and the cell measurement on the second cell 430 at different time points or timings.

According to an embodiment, the electronic device 101 may perform cell measurement by receiving the SSB associated with each cell, using the beamforming of the reception beam associated with each cell. For example, the electronic device 101 may perform cell measurement on the first cell 420 by receiving the SSB corresponding to the specified transmission beam of the first cell 420 using the beamforming of the specified reception beam. For example, the electronic device 101 may perform cell measurement by measuring the strength (e.g., the reception power of a reference signal) of the signal for receiving the SSB. For example, the specified reception beam and the specified transmission beam may correspond to the combination of the reception beam and the transmission beam, which are determined by a beam tracking procedure.

According to various embodiments, the electronic device 101 may receive SSB measurement timing information from a serving cell. For example, the SSB measurement timing information may be referred to as "SSB-based radio resource management (RRM) measurement timing configuration (SMTC)". For example, the SSB measurement timing information may include SMTC period information, SMTC window duration information, and/or offset information. The SMTC period information may include the period in which the electronic device 101 receives an SSB. The SMTC window duration information may include the length of the SMTC window duration in which the electronic device 101 receives the SSB in the corresponding SMTC period. The length of the SMTC window duration may not be less than at least part of the length of the SS burst. The offset information may include information associated with the starting point of the SMTC window duration in the SMTC period.

According to various embodiments, the electronic device 101 may receive the SSB in the SMTC window duration of the DRX duration by the paging cycle. According to an embodiment, the electronic device 101 may determine the period, length, and starting point of the SMTC window duration, using the SMTC period information, the SMTC window duration information, and the offset information. The electronic device 101 may measure the first cell 420 and/or the second cell 430 in the determined SMTC window duration. For example, when the difference in measurement timing between the SSB associated with the first cell 420 and the SSB associated with the second cell 430 is shorter than a specified time duration, at least part of measurement time duration for the first cell 420 and measurement time duration for the second cell 430 may overlap with each other in a time domain. In this case, the electronic device 101 may fail to receive the SSB associated with the first cell 420 and the SSB associated with the second cell 430 at the same time. For example, the measurement time duration for each cell may include RF tuning time for changing the RF configuration (e.g., the change of the reception beam) associated with each cell.

According to an embodiment, the electronic device 101 may determine the cell measurement in a plurality of SMTC window durations, based at least partly on the difference of cell measurement timing for each cell. For example, when the difference in measurement timing between the SSB associated with the first cell 420 and the SSB associated with the second cell 430 is shorter than the specified time duration, the electronic device 101 may receive the SSB from the first cell 420, using the reception beam associated with the first cell 420 in the SMTC window duration of the first SMTC period and may receive the SSB from the second cell 430, using the reception beam associated with the second cell 430 in the SMTC window duration of the second SMTC period. For example, according to an embodiment in the measurement for each cell, when the reception beam associated with the first cell 420 and the reception beam associated with the second cell 430 are different from each other, the electronic device 101 may receive the SSB from the first cell 420, using the reception beam associated with the first cell 420 in the SMTC window duration of the first SMTC period and may receive the SSB from the second cell 430, using the reception beam associated with the second cell 430 in the SMTC window duration of the second SMTC period.

According to various embodiments, the electronic device 101 may control the state of the communication module (e.g., the auxiliary processor 123 of FIG. 1, the wireless communication module 192 and/or the third antenna module 246 of FIG. 2), using the SSB measurement timing information. For example, the electronic device 101 may control the state of the communication module as the second state (e.g., an active or wake-up state) during the time duration corresponding to the SMTC window duration and may control the state of the communication module as the first state (e.g., an idle or inactive state). For example, the time duration corresponding to the SMTC window duration may mean the time including at least part of the SMTC window duration or the time of RF tuning (or reconfiguration) with at least part (e.g., the time (e.g., the time in unit of symbols) required to measure an SSB) of the SMTC window duration. According to an embodiment, the electronic device 101 in the RRC inactive state or the RRC idle state may control the communication module to be in the second state in only the time duration corresponding to the SMTC window duration and may control the communication module to be in the first state in the remaining time durations. For example, when the cell measurement is set for a plurality of cells and the reception beams associated with a plurality of cells are different from one another, the electronic device 101 may perform cell measurement on a plurality of cells, by periodically transitioning the communication module to the second state based on the SS measurement timing information.

Figure 5:
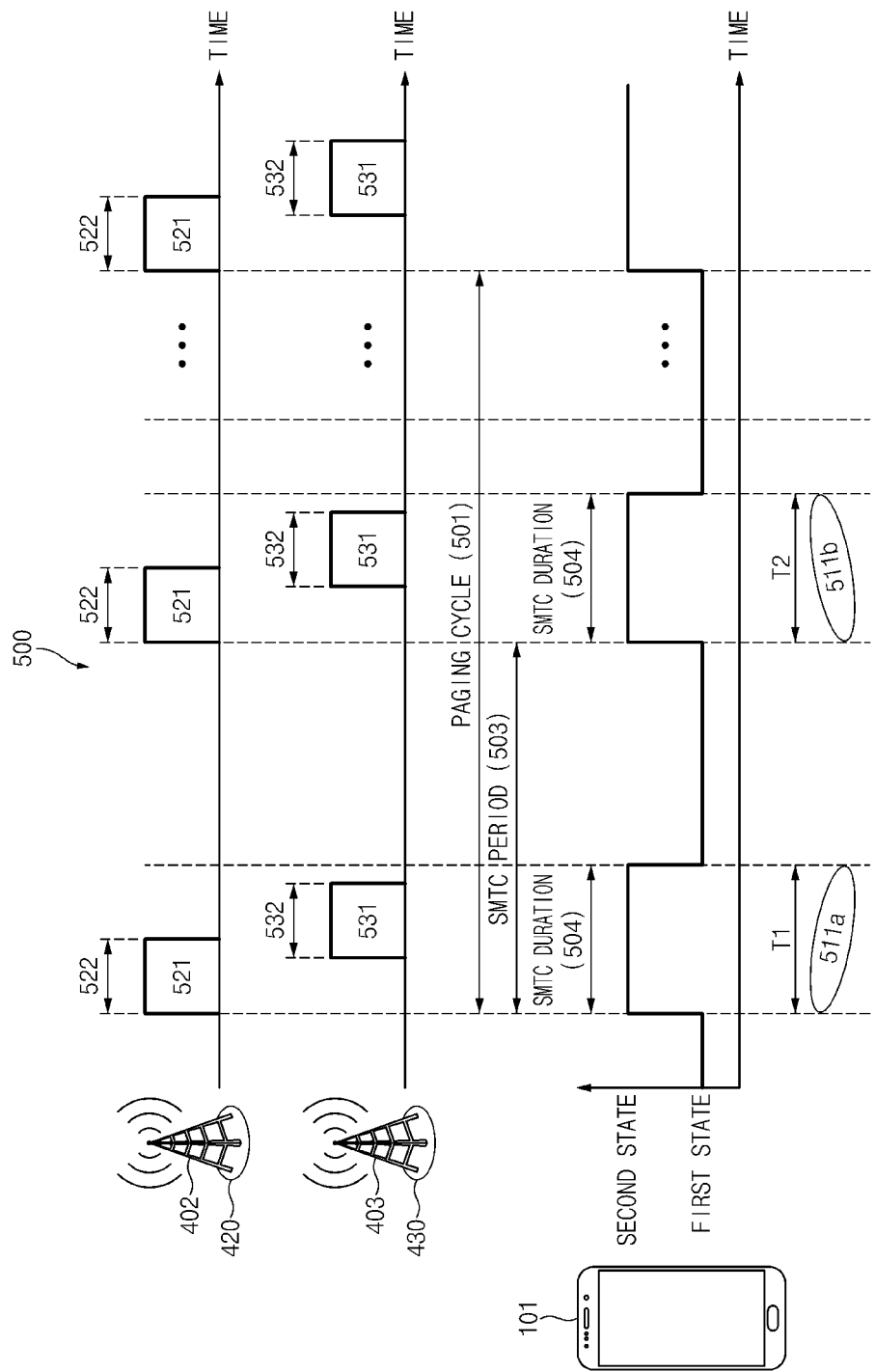
FIG. 5 illustrates cell measurement timing of an electronic device, according to various embodiments.

FIG. 5 illustrates cell measurement timing of an electronic device, according to various embodiments.

Referring to FIG. 5, according to various embodiments, the first external electronic device 402 may periodically transmit a first SSB 521. For example, the first SSB 521 may mean an SSB corresponding to a transmission beam through which the electronic device 101 performs cell measurement on the first cell 420. The first SSB 521 may correspond to one of a plurality of SSBs (not illustrated) included in an SS burst. According to various embodiments, the second external electronic device 403 may periodically transmit a second SSB 531. For example, the second SSB 531 may mean an SSB corresponding to a transmission beam through which the electronic device 101 performs cell measurement on the second cell 430. The second SSB 531 may correspond to one of a plurality of SSBs (not illustrated) included in an SS burst.

According to various embodiments, the electronic device 101 may be configured to measure the first cell 420 and the second cell 430 every paging cycle 501. According to an embodiment, the electronic device 101 may be configured to receive an SSB in at least one SMTC duration 504 (e.g., SMTC window duration) of the DRX duration according to the paging cycle 501.

According to an embodiment, the plurality of SMTC durations 504 may be set depending on an SMTC period 503. For example, referring to FIG. 5, the reception beam associated with the first cell 420 may be a first reception beam 511*a*; the reception beam associated with the second cell 430 may be a second reception beam 511*b*. For example, the first reception beam 511*a* and the second reception beam 511*b* may be beams formed in different directions from each other. The first reception beam 511*a* and the second reception beam 511*b* may correspond to different beamforming vectors from each other.

According to various embodiments, the electronic device 101 may perform cell measurement on a plurality of cells in the single SMTC duration or the plurality of SMTC durations 504, based on whether the measurement of beams associated with a plurality of cells in the single SMTC duration 504 is performed. For example, when the electronic device 101 is capable of measuring a plurality of cells (e.g., the first cell 420 and the second cell 430) configured to be measured by the electronic device 101 in the single SMTC duration 504, the electronic device 101 may perform cell measurement on a plurality of cells in the single SMTC duration 504. For another example, when the electronic device 101 is not capable of measuring a plurality of cells (e.g., the first cell 420 and the second cell 430) configured to be measured by the electronic device 101 in the single SMTC duration 504, the electronic device 101 may perform cell measurement on a plurality of cells in the plurality of SMTC durations 504.

According to an embodiment, the electronic device 101 may determine whether to perform the measurement of a plurality of cells in the single SMTC duration 504, based at least partly on whether the transmission periods of beams associated with a plurality of cells overlap with one another. For example, at least part of the first period of time 522 of the first SSB 521 and at least part of the second period of time 532 of the second SSB 531 may overlap with each other in a time domain. For another example, at least part of the measurement time of the electronic device 101 for the first SSB 521 and at least part of the measurement time of the electronic device 101 for the second SSB 531 may overlap with each other in a time domain. In this case, the electronic device 101 may separately receive (e.g., measure) the first SSB 521 and the second SSB 531 on the SMTC durations 504 at different timings, based on the SMTC period 503.

According to an embodiment, the electronic device 101 may receive at least part of the first synchronization signal 521 in the SMTC duration 504 corresponding to the time duration T1, using the first reception beam 511*a*. The electronic device 101 may receive at least part of the second synchronization signal 531 in the SMTC duration 504 corresponding to the time duration T2, using the second reception beam 511*b*. For example, the electronic device 101 may perform cell measurement on the first cell 420, using at least part of the received first synchronization signal 521 and may perform cell measurement on the second cell 430, using at least part of the received second synchronization signal 531.

According to various embodiments, the electronic device 101 may control a communication module (e.g., the wireless communication module 192 and/or the third antenna module 246 of FIG. 2) to be in the second state during the time corresponding to the SMTC duration 504. For example, the second state (e.g., an active or wake-up state) may mean a state in which power consumption is higher than the power consumption in the first state (e.g., an idle or inactive state). For example, the electronic device 101 may control the communication module to be in the second state in only the part of the paging cycle 501, based at least partly on the SMTC duration 504 and the SMTC period 503. For example, instead of maintaining the communication module in the second state until the measurement is performed on all cells within the paging cycle 501, the power consumption of the electronic device 101 may be reduced by transitioning the communication module to the second state in only the time durations T1 and T2 corresponding to the SMTC duration 504 according to the SMTC period 503.

Figure 14:
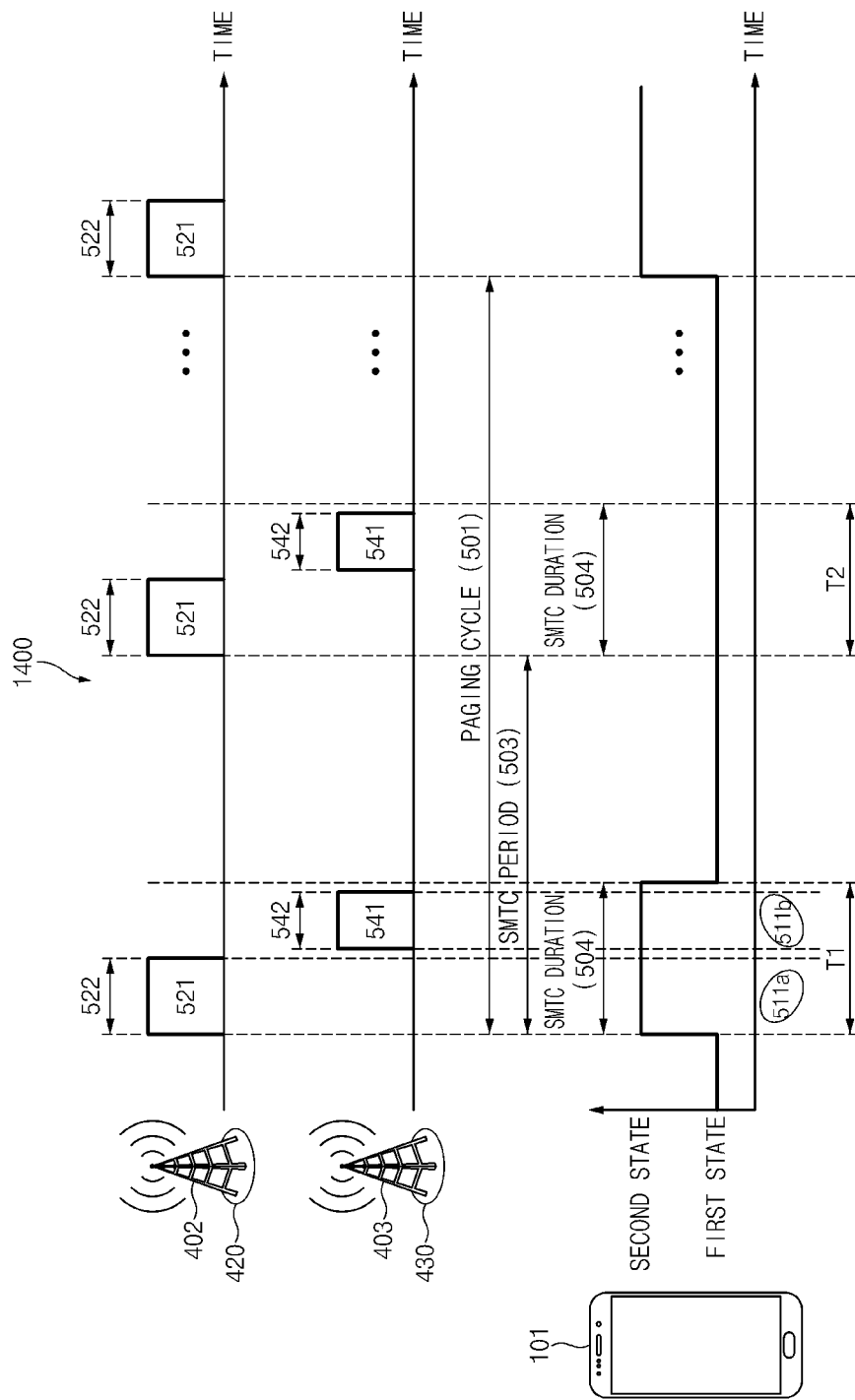
FIG. 14 illustrates cell measurement timing of an electronic device, according to various embodiments.

Referring to FIG. 14, the illustration in which the electronic device 101 is capable of measuring a plurality of cells in the single SMTC duration 504 will be described. Unless otherwise described, the descriptions given with reference to FIG. 5 will be identically applied to the descriptions given with reference to FIG. 14. According to various embodiments, a third external electronic device 404 (e.g., a base station) may periodically transmit a third SSB 541. For example, the third SSB 541 may mean an SSB corresponding to a transmission beam through which the electronic device 101 performs cell measurement on a third cell 440. The third SSB 541 may correspond to one of a plurality of SSBs (not illustrated) included in an SS burst. The electronic device 101 may be configured to measure the first cell 420 and the third cell 440 every paging cycle 501.

For example, the first period of time 522 of the first SSB 521 and the third period of time 542 of the third SSB 541 may not overlap with each other in a time domain. For another example, the measurement time of the electronic device 101 for the first SSB 521 and the measurement time of the electronic device 101 for the third SSB 541 may not overlap with each other in a time domain. In this case, the electronic device 101 may separately receive (e.g., measure) the first SSB 521 and the third SSB 541 in the single SMTC period 503 (e.g., the time duration T1).

According to an embodiment, the electronic device 101 may receive at least part of the first synchronization signal 521 in at least part of the SMTC duration 504 corresponding to the time duration T1, using the first reception beam 511a and may receive at least part of a third synchronization signal 541 in at least part of the SMTC duration 504 corresponding to the time duration T1, using the second reception beam 511b. For example, the electronic device 101 may perform cell measurement on the first cell 420, using at least part of the received first synchronization signal 521 and may perform cell measurement on the third cell 440, using at least part of the received third synchronization signal 541.

According to various embodiments, the electronic device 101 may control a communication module (e.g., the wireless communication module 192 and/or the third antenna module 246 of FIG. 2) to be in the second state during the time corresponding to the SMTC duration 504. For example, the second state (e.g., an active or wake-up state) may mean a state in which power consumption is higher than the power consumption in the first state (e.g., an idle or inactive state). Unlike the illustration of FIG. 5, because the measurement for all cells is completed within the first SMTC duration T1, the electronic device 101 may maintain the communication module in the first state until the next paging cycle 501. Accordingly, the electronic device 101 may not transition the communication module to the second state in the second SMTC duration T2 after T1 for separate measurement.

An embodiment is exemplified in FIGS. 5 and 14 as the start of the paging cycle 501 and the start of the SMTC period 503 coincide with each other. However, embodiments of the disclosure are not limited thereto. For example, the start of the paging cycle 501 and the start of the SMTC period 503 do not coincide and the SMTC period 503 or the starting point of the SMTC duration 504 may be indicated by the electronic device 101 depending on the value included in SS measurement timing configuration information. For example, the electronic device 101 may determine the SMTC period 503 and/or the starting point of SMTC duration 504, using the offset included in the SS measurement timing configuration information.

An embodiment is exemplified in FIGS. 5 and 14 as the length of the SMTC duration 504 and the length of the time duration T1 or T2 corresponding thereto are the same as each other. However, embodiments of the disclosure are not limited thereto. According to an embodiment, the time durations T1 and T2 may be the time longer than the SMTC duration 504. For example, the time durations T1 and T2 may further include the time for tuning and/or reconfiguration of the communication module. According to an embodiment, the time durations T1 and T2 may be the time shorter than the SMTC duration 504. For example, the time durations T1 and T2 may correspond to the time duration corresponding to only the at least part of the first synchronization signal 521 and the second synchronization signal 531. In this case, the time durations T1 and T2 may further include the time for tuning and/or reconfiguration of the communication module.

Figure 6:
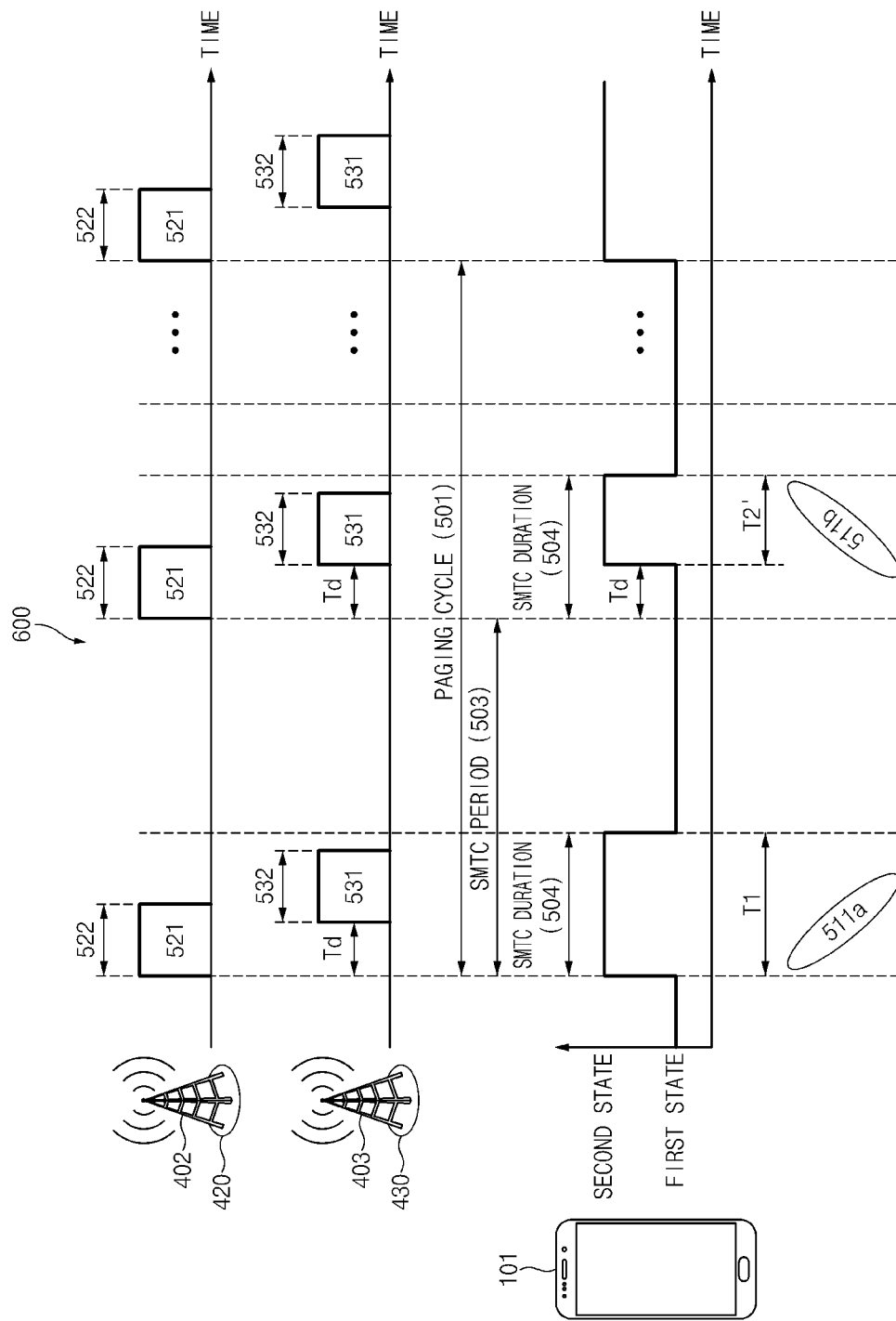
FIG. 6 illustrates cell measurement timing based on the previous cell measurement of an electronic device, according to various embodiments.

FIG. 6 illustrates cell measurement timing 600 based on the previous cell measurement of the electronic device 101, according to various embodiments.

According to various embodiments, the electronic device 101 may control the operation state of the communication module (e.g., the wireless communication module 192 and/or the third antenna module 246 of FIG. 2) to be a first state or a second state, based on a timing difference Td estimated in the previous SMTC period. According to an embodiment, the electronic device 101 may control the communication module to be in the first state by the duration corresponding to the at least timing difference of the SMTC duration of the next SMTC period, based on the timing difference Td estimated in the previous SMTC period. For example, the electronic device 101 may receive at least part of the first SSB 521 in the time duration T1 corresponding to the SMTC duration 504, using the first reception beam 511a. In this case, the electronic device 101 may receive at least part of the second synchronization signal 531 in the time duration T1, using the first reception beam 511a. For example, the electronic device 101 may estimate the timing difference Td between the first synchronization signal 521 and the second synchronization signal 531 in the time duration T1, based on at least part of the first synchronization signal 521 and/or the second synchronization signal 531 received in the time duration T1. The electronic device 101 may control the communication module to be in the second state by the time duration T2' other than the time corresponding to the estimated timing difference Td, in the SMTC duration 504 of the next period. In this case, the time in which the communication module operates in the first state may increase based on the timing difference Td.

Figure 7:
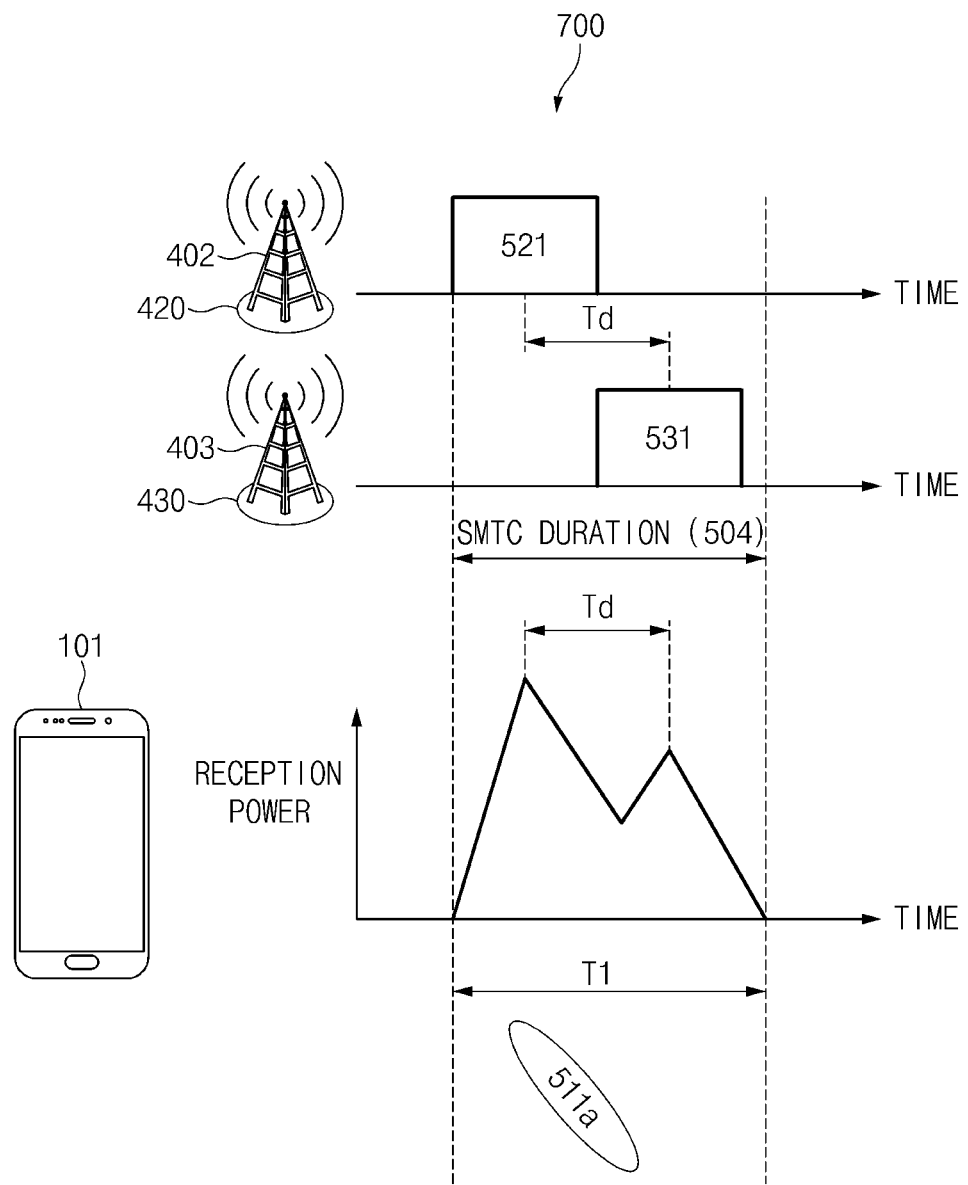
FIG. 7 illustrates a cell measurement timing difference, according to an embodiment.

FIG. 7 illustrates a cell measurement timing difference 700, according to an embodiment.

Referring to FIG. 7, for example, the electronic device 101 may transition a communication module (e.g., the wireless communication module 192 and/or the third antenna module 246 of FIG. 2) to be in a second state during the first time duration. For example, the electronic device 101 may attempt to receive an SSB during the first time duration, using the first reception beam 511a associated with the first cell 420.

As described above, for example, the reception beam associated with the first cell 420 may be different from the reception beam associated with the second cell 430. In this case, even though the first SSB 521 is received using the first reception beam 511a, the reception power by the second SSB 531 may appear in the electronic device 101.

According to an embodiment, the electronic device 101 may determine the timing difference Td based on a peak difference between the reception power by the first SSB 521 and the reception power by the second SSB 531. For example, the electronic device 101 may determine the timing difference Td based on the correlation between the peak of the reception power by the first SSB 521 and the peak of the reception power by the second SSB 531.

Returning to FIG. 6, according to various embodiments, the electronic device 101 may determine whether to perform the cell measurement of the second cell 430, based on the reception power of the second SSB 531 of the second cell 430 measured in the SMTC duration 504 associated with the first cell 420. As described with reference to FIG. 7, the electronic device 101 may receive at least part of the second SSB 531 associated with the second cell 430 in the time duration T1, using the first reception beam 511a associated with the first cell 420. According to an embodiment, the electronic device 101 may determine whether to perform the cell measurement associated with the second cell 430, based on the reception power of at least part of the second SSB 531 received using the first reception beam 511a. For example, when the reception power of the second SSB 531 received in the time duration T1 is not less than a specified range, the electronic device may skip the cell measurement associated with the second cell 430 in the next SMTC period 503. For example, the electronic device 101 may maintain the state of the communication module in the first state during the SMTC duration 504 of the next SMTC period 503 (in this case, the transition to the second state may be skipped in the time duration T2').

For example, while measuring the first SSB 521 of the first cell 420 in the time duration T1, the electronic device 101 may obtain the reception power of the second SSB 531 of the second cell 430 measured using the first reception beam 511a paired with the first cell 420. In this case, because the first reception beam 511a is not the second reception beam 511b paired with the second cell 430, the electronic device 101 may obtain reception power lower than the reception power obtained using the second reception beam 511b paired with second SSB 531. The electronic device 101 may roughly estimate the electric field situation associated with the second cell 430, using the reception power of the second SSB 531 of the second cell 430 measured using the first reception beam 511a paired with the first cell 420. For example, the electronic device 101 may perform cell measurement or beam tracking based on the estimated electric field situation of the second cell 430.

According to various embodiments, when the reception power of the SSB from a neighbor cell (e.g., the second cell 430) measured using the reception beam (e.g., the first reception beam 511a) associated with another cell (e.g., the first cell 420) in the measurement duration (e.g., the time duration T1) for the other cell is less than a specified range, the electronic device 101 may determine the skip of the cell measurement for a neighbor cell within the paging cycle 501 corresponding to a measurement duration. According to an embodiment, the specified range may be set based at least partly on cell reselection threshold. For example, the cell reselection threshold may mean the threshold of a reference signal reception power that allows the electronic device 101 to trigger a cell reselection procedure. For example, when the sum of the reception power of the SSB (e.g., the second SSB 531) of the neighbor cell received using the reception beam associated with the other cell in the measurement duration for the other cell and the specified offset power is not less than the cell reselection threshold, the electronic device 101 may perform cell measurement on the neighbor cell in the next SMTC period 503. For example, when the sum of the reception power of the SSB of the neighbor cell received using the reception beam associated with the other cell in the measurement duration for the other cell and the specified offset power is less than the cell reselection threshold, the electronic device 101 may skip cell measurement on the neighbor cell in the next SMTC period 503.

According to various embodiments, the electronic device 101 may determine the specified offset power based on the first reception beam 511a and the value estimated from the mismatch associated with the second SSB 531. For example, the specified offset power may be the value estimated based on the theoretical mismatch between the first reception beam 511a and the second reception beam 511b. According to an embodiment, the specified offset power may be the value specified based at least partly on the differences between the reception power using a specific reception beam and the reception powers of the same signal using other reception beams. For example, the specified offset power may correspond to the average value of the differences between the reception power using the specific reception beam and the reception powers of the same signal using other reception beams, the greatest value of the differences, or the smallest value of the differences.

Figure 8:
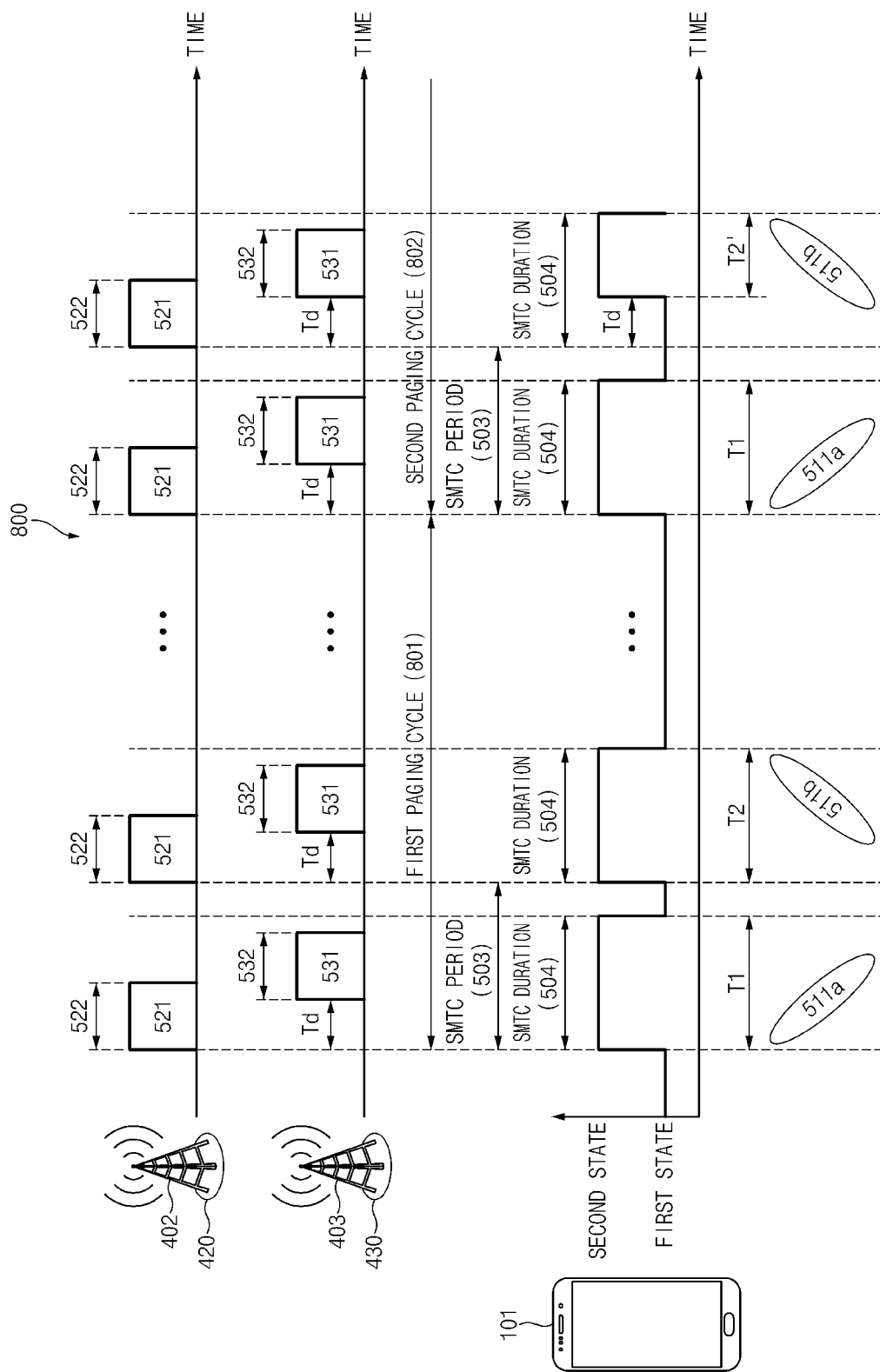
FIG. 8 illustrates cell measurement timing based on a previous paging cycle of an electronic device, according to various embodiments.

FIG. 8 illustrates cell measurement timing 800 based on a previous paging cycle of the electronic device 101, according to various embodiments.

With reference to FIG. 6, it is described that the timing difference Td estimated in the previous SMTC period 503 is applied to the time duration for receiving the SSB in the next SMTC period 503. Referring to FIG. 8, according to various embodiments, the electronic device 101 may control the state of the communication module (e.g., the wireless communication module 192 and/or the third antenna module 246 of FIG. 2) by reflecting the timing difference Td estimated in the previous paging cycle (e.g., the active duration of the previous paging cycle) to the next paging cycle (e.g., the active duration of the next paging cycle). For example, the electronic device 101 may adjust the time duration for receiving the second SSB 531 in a second paging cycle 802 to T2', using the timing difference Td estimated in a first paging cycle 801.

According to various embodiments, the electronic device 101 may perform the above-described power control and cell measurement control depending on the state of the electronic device 101. According to an embodiment, when the electronic device 101 is in a stationary state, the electronic device 101 may perform the power control and cell measurement control. For example, when the mobility (e.g., a reception power change, acceleration, movement speed, and/or a position change amount) of the electronic device 101 is less than the specified range, the electronic device 101 may perform the above-described power control and cell measurement control.

According to various embodiments, when the specified condition is satisfied, the electronic device 101 may minimize the second state operation time required for the cell measurement, based on the previously measured cell measurement. For example, the electronic device 101 may control the communication module to be in the second state by only the time corresponding to at least part of symbols of the SSB.

FIG. 9 illustrates a resource mapping structure of an SSB 900, according to various embodiments.

Referring to FIG. 9, the SSB 900 (e.g., the first SSB 521 and/or the second SSB 531 of FIG. 5) may have the length of 4 orthogonal frequency division multiplexing (OFDM) symbols. The SSB 900 may include PSS, SSS, and PBCH. For example, each of the PSS and the SSS may have the length of 1 OFDM symbol; the PBCH may include at least 2 OFDM symbols. The PBCH may include a reference signal (e.g., demodulation reference signal (DMRS)) for channel estimation. According to an embodiment, the electronic device 101 may perform cell measurement, using the reference signal included in the PBCH.

According to an embodiment, the power offset between DMRS of the PBCH of the first OFDM symbol, SSS of the second OFDM symbol, and DMRS of the PBCH of the third OFDM symbol may be 0 dB. For example, the electronic device 101 may perform cell measurement based on the average of powers (the reception power of DMRS and SSS) measured in 3 OFDM symbols. In this case, the electronic device 101 may perform cell measurement, using only the first, second, and third OFDM symbols. For example, the electronic device 101 may perform cell measurement based on the average of powers measured in 2 OFDM symbols. In this case, the electronic device 101 may perform cell measurement, using the first and second OFDM symbols, using the second and third OFDM symbols, or using the first and third OFDM symbols. For example, the electronic device 101 may perform cell measurement based on the reception power measured in 1 OFDM symbol. In this case, the electronic device 101 may perform cell measurement, using the first, second, or third OFDM symbol.

Figure 10:
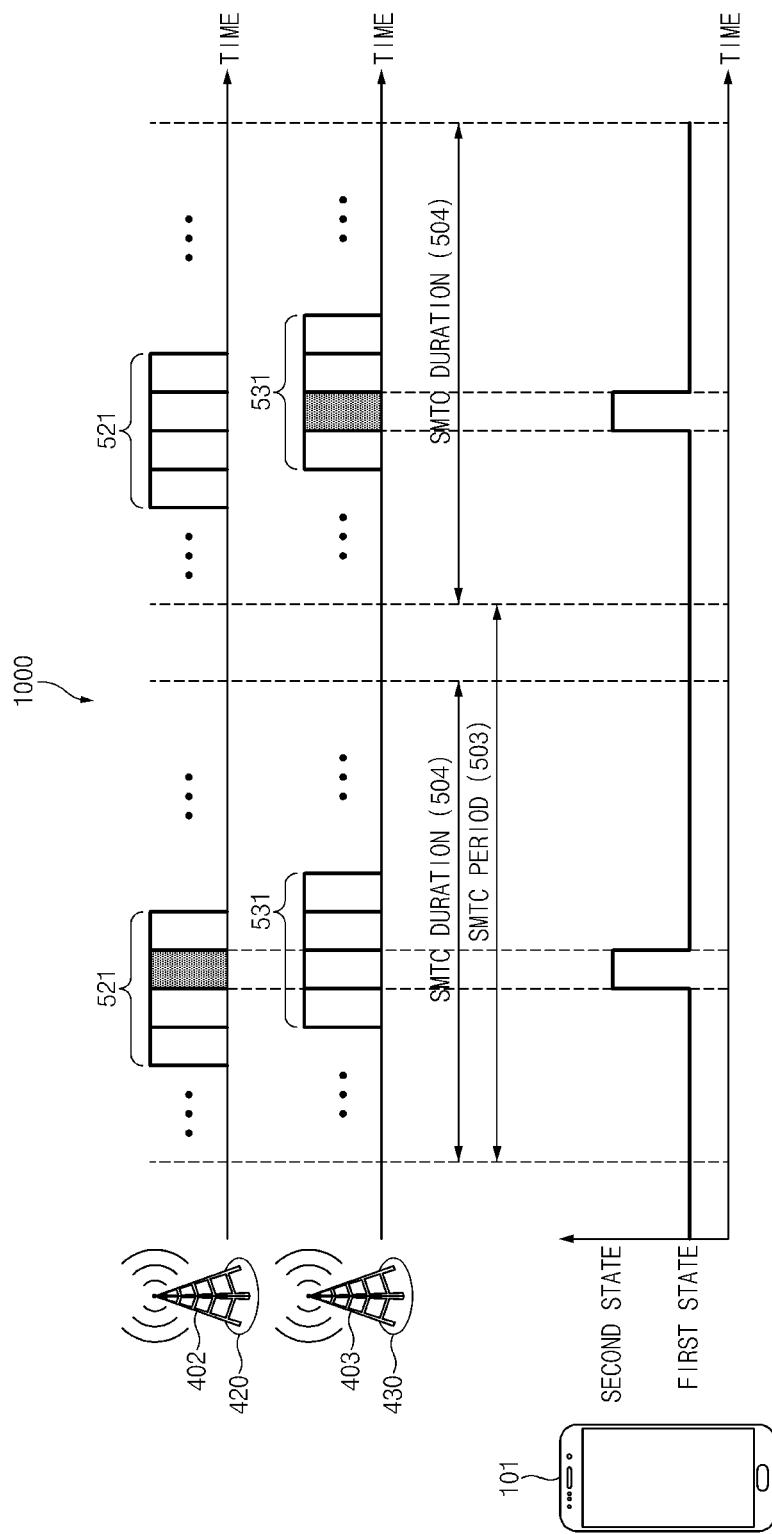
FIG. 10 illustrates symbol-based cell measurement timing, according to various embodiments.

FIG. 10 illustrates symbol-based cell measurement timing 1000, according to various embodiments.

As described above with reference to FIG. 9, the electronic device 101 may perform cell measurement, using only the part of 4 OFDM symbols of an SSB. According to various embodiments, the electronic device 101 may perform cell measurement, using the specified at least one OFDM symbol among 4 OFDM symbols. According to an embodiment, the electronic device 101 may control the communication module (e.g., the wireless communication module 192 and/or the third antenna module 246 of FIG. 2) to be in the second state during the time duration (e.g., the length OFDM symbols used for cell measurement and the time required for RF tuning or RF reconfiguration) corresponding to the length of OFDM symbols used for cell measurement. According to an embodiment, the electronic device 101 may determine the OFDM symbol to be used for measurement in the next paging cycle, based on the reception power of OFDM symbols of the SSB received in the active duration of the previous paging cycle. For example, the electronic device 101 may perform cell measurement in the next paging cycle, using an OFDM symbol, which has the highest reception power, from among OFDM symbols of the SSB received in the active duration of the previous paging cycle.

Referring to FIG. 10, according to various embodiments, the electronic device 101 may perform cell measurement, using only the single OFDM symbol. According to an embodiment, the electronic device 101 may perform cell measurement in the SMTC duration 504 of the first SMTC period 503, using the third OFDM symbol of the first SSB 521. For example, the third OFDM symbol may be the specified OFDM symbol or an OFDM symbol, which has the highest reception power, from among OFDM symbols of the first SSB 521 received in the previous paging cycle. In this case, the electronic device 101 may control the communication module to be in the second state during only the time duration corresponding to the third OFDM symbol of the first SSB 521 within the SMTC period 503. According to an embodiment, the electronic device 101 may perform cell measurement in the SMTC duration 504 of the second SMTC period 503, using the second OFDM symbol of the second SSB 531. For example, the second OFDM symbol may be the specified OFDM symbol or an OFDM symbol, which has the highest reception power, from among OFDM symbols of the second SSB 531 received in the previous paging cycle. In this case, the electronic device 101 may control the communication module to be in the second state during only the time duration corresponding to the second OFDM symbol of the second SSB 531 within the SMTC period 503.

According to various embodiments, the electronic device 101 may perform the power control and cell measurement control, which are described with reference to FIGS. 9 and 10, depending on the state of the electronic device 101. According to an embodiment, when the electronic device 101 is in a stationary state, the electronic device 101 may perform the power control and cell measurement control described with reference to FIGS. 9 and 10. For example, when the mobility (e.g., a reception power change, acceleration, movement speed, and/or a position change amount) of the electronic device 101 is less than the specified range, the electronic device 101 may perform the power control and cell measurement control, which are described with reference to FIGS. 9 and 10. For example, when the mobility of the electronic device 101 is less than a specified first range, the electronic device 101 may perform the power control and cell measurement control, which are described with reference to FIGS. 5 to 8; when the mobility of the electronic device 101 is less than a second range, the electronic device 101 may perform the power control and cell measurement control, which are described with reference to FIGS. 9 and 10. The second range may correspond to the mobility lower than the mobility in the first range.

Figure 11:
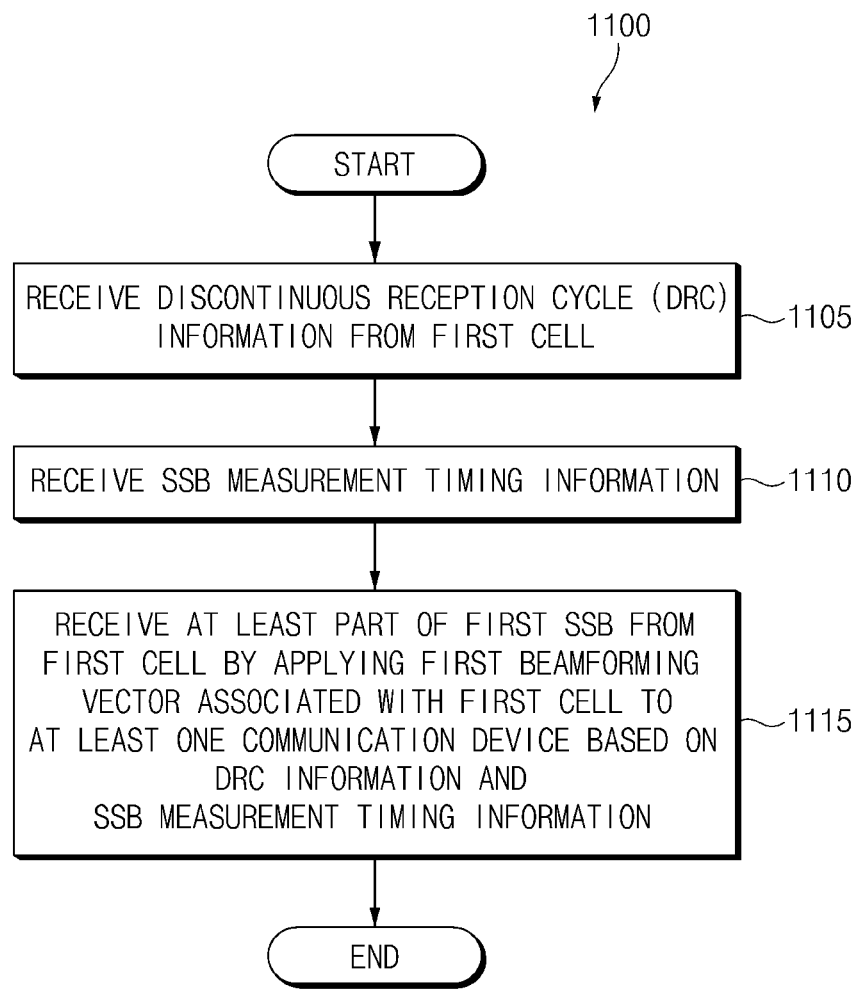
FIG. 11 illustrates a flowchart of a reference signal reception method of an electronic device, according to various embodiments.
Figure 12:
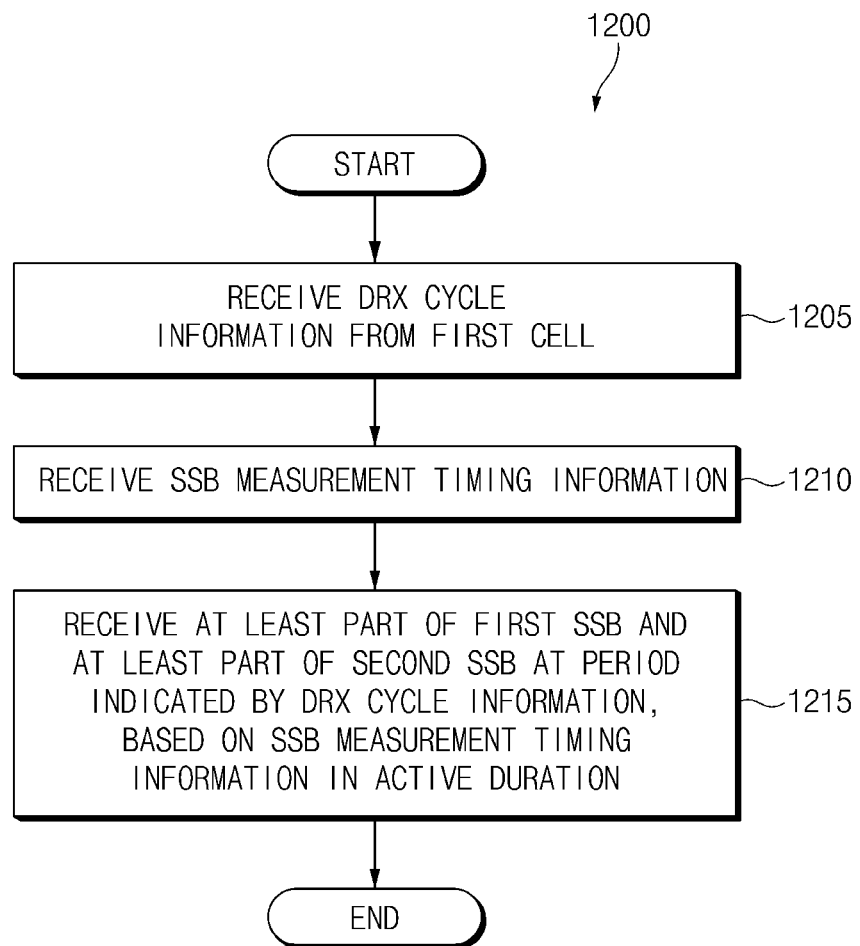
FIG. 12 illustrates a flowchart of a reference signal reception method from a plurality of cells of an electronic device, according to various embodiments.
Figure 13:
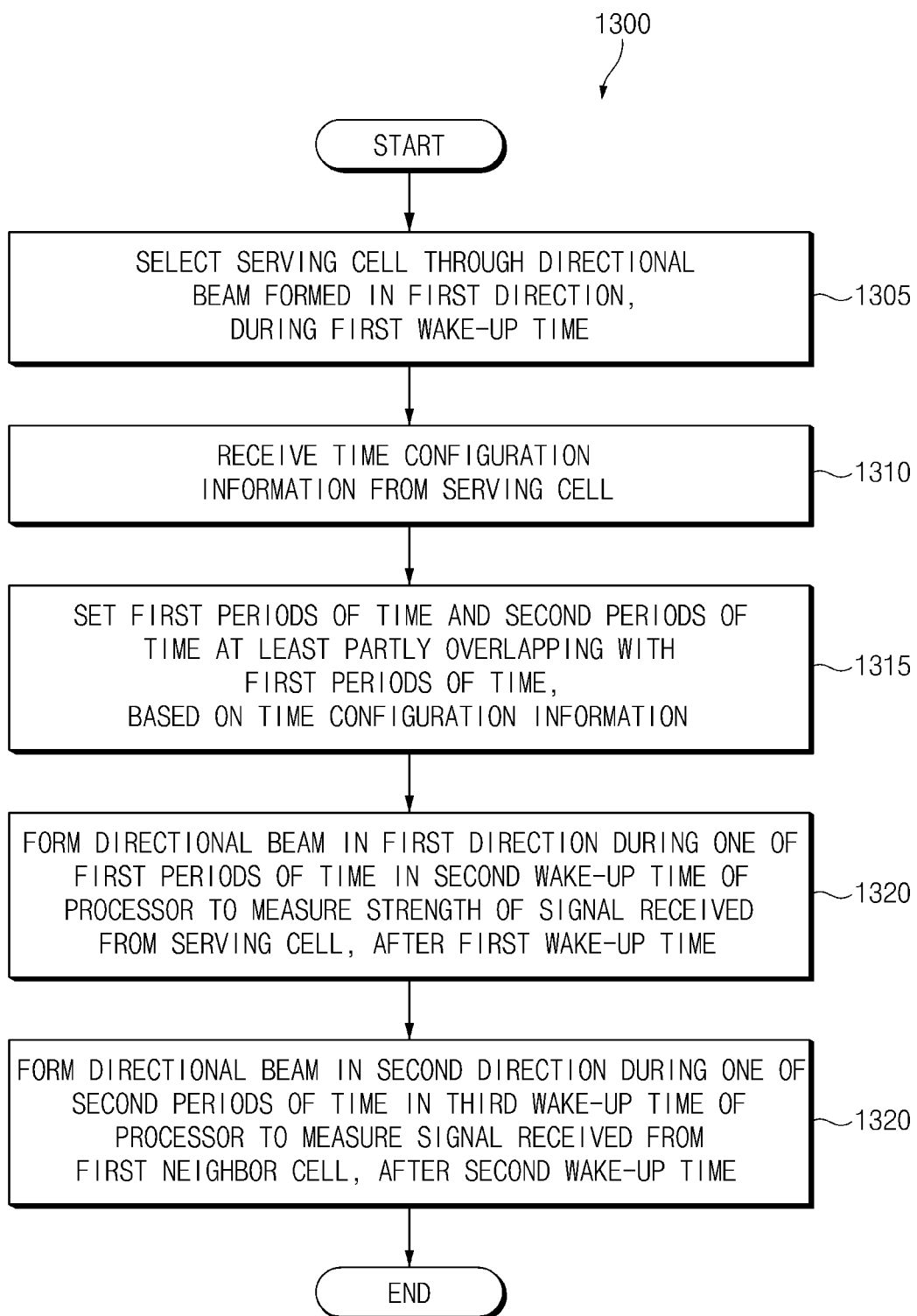
FIG. 13 illustrates a flowchart of a synchronization signal receiving method of an electronic device, according to various embodiments.

Referring to FIGS. 11 to 13, in the following descriptions, for example, the operations of the electronic device 101 may be performed by the processor 120, the wireless communication module 192, and/or the third antenna module 246 of FIG. 2.

According to various embodiments, the electronic device 101 may include a memory (e.g., the memory 130 of FIG. 1), at least one communication device (e.g., the third antenna module 246 of FIG. 2) including a plurality of conductive plates (e.g., the first AE group 340 and/or the second AE group 345 of FIG. 3), and at least one processor (e.g., the processor 120 and/or wireless communication module 192 of FIG. 2) operatively connected to the memory (e.g., the memory 130 of FIG. 1) and at least one communication device.

According to various embodiments, the electronic device 101 may include a memory (e.g., the memory 130 of FIG. 1), at least one communication device (e.g., the third antenna module 246 of FIG. 2) configured to perform beamforming, and at least one processor (e.g., the processor 120 and/or wireless communication module 192 of FIG. 2) operatively connected to the memory (e.g., the memory 130 of FIG. 1) and at least one communication device.

The above-described structure of the electronic device 101 is exemplary, and the structure of the electronic device 101 is not limited to the above-described structure. The above-described operations of the electronic device 101 may be performed by the electronic device 101 having the above-described structure or another exemplary structure (e.g., refer to FIG. 1) of the electronic device 101. The operations of the electronic device 101 described with reference to FIGS. 11 to 13 may correspond to at least part of the operations of the electronic device 101 described with reference to FIGS. 4 to 10 and 14; the operations of the electronic device 101 described with reference to FIGS. 4 to 10 and 14 may be combined with the operations of the electronic device 101 described with reference to FIGS. 11 to 13.

FIG. 11 illustrates a flowchart of a reference signal reception method 1100 of the electronic device 101, according to various embodiments.

According to various embodiments, in operation 1105, the electronic device 101 may receive discontinuous reception cycle (DRC) information (e.g., paging cycle information) from the first cell (e.g., the serving cell (e.g., the first cell 420 of FIG. 4) of the electronic device 101). For example, the electronic device 101 may receive DRC information from the first cell 420 through upper layer signaling (e.g., RRC signaling). The electronic device 101 may receive the DRC information from the first cell 420, using at least one communication device.

According to various embodiments, in operation 1110, the electronic device 101 may receive SSB measurement timing information (e.g., SMTC information). For example, the electronic device 101 may receive the SSB measurement timing information from the first cell 420, using at least one communication device. The electronic device 101 may receive the SSB measurement timing information through the upper layer signaling (e.g., RRC signaling).

According to various embodiments, in operation 1115, the electronic device 101 may receive at least part of a first SSB (e.g., the first SSB 521 of FIG. 1) from the first cell 420, by applying the first beamforming vector (e.g., the beamforming vector corresponding to the first beam 511a of FIG. 5) associated with the first cell 420 to at least one communication device based on the DRC information and the SSB measurement timing information. For example, the electronic device 101 may control at least one communication circuit to be in the second state during at least part (e.g., the time duration T1 of FIG. 5) of the DRX duration (e.g., the paging cycle 501 of FIG. 5) based on the SSB measurement timing information and then may receive at least part of the first SSB 521. The electronic device 101 may control at least one communication device to be in the first state having power consumption lower than the power consumption in the second state, during a part of the duration indicated by the active duration information based on the SSB measurement timing information.

According to various embodiments, the electronic device 101 may receive at least part of the second SSB (e.g., the second SSB 531 of FIG. 5) from the second cell 430, by applying the beamforming vector corresponding to the second beamforming vector (e.g., the beamforming vector corresponding to the second beam 511b of FIG. 5) associated with the second cell (e.g., the second cell 430 of FIG. 5) to at least one communication device based on the DRC information and the SSB measurement timing information. The electronic device 101 may control at least one communication device to be in the second state based on the SSB measurement timing information and then may receive at least part of the second SSB 531. The electronic device 101 may be configured to control at least one communication device to be in the first state based on the SSB measurement timing information.

According to various embodiments, the SSB measurement timing information may include SSB measurement window duration information (e.g., information of the SMTC duration 504 of FIG. 5) and SSB measurement period information (e.g., information of the SMTC period 503 of FIG. 5). The electronic device 101 may be configured to receive at least part of the first SSB based at least partly on the SSB measurement period information within the first SSB measurement window (e.g., the time duration T2 corresponding to the SMTC duration 504 of FIG. 5) and to receive at least part of the second SSB 531 within the second SSB measurement window. For example, the first SSB measurement window (e.g., T1) and the second SSB measurement window (e.g., T2) may correspond to time windows different from each other within the DRC of 1 period indicated by the DRC information.

According to various embodiments, the electronic device 101 may be configured to determine the timing difference (e.g., Td of FIG. 6) between the first cell 420 and the second cell 430 based on the reception power measured within the first SSB measurement window and to control at least one communication device to be in the first state during the time corresponding to the timing difference within the second SSB measurement window.

According to various embodiments, the SSB measurement timing information may include offset information; the electronic device 101 may be configured to determine the starting point of each of the first SSB measurement window and the second SSB measurement window based on the offset information.

According to various embodiments, the SSB measurement timing information may include SSB measurement window information and SSB measurement period information. The electronic device 101 may be configured to measure the reception power of the second SSB 531 by applying the first beamforming vector to at least one communication device within the first SSB measurement window based at least partly on SSB measurement period information; when the reception power of the second SSB 531 is not less than a specified range, the electronic device 101 may be configured to receive at least part of the second SSB 531 within the second SSB measurement window. When the reception power of the second SSB 531 is less than the specified range, the electronic device 101 may be configured to skip the reception of at least part of the second SSB 531 within the second SSB measurement window.

According to various embodiments, the first SSB 521 may include PSS, SSS, and PBCH and may have the length of 4 OFDM symbols in the time domain According to various embodiments, the electronic device 101 may be configured to control at least one communication device to be in the second state during the duration corresponding to the partial symbol duration of the first SSB 521 and to receive a part of the first SSB 521.

According to various embodiments, the electronic device 101 may be in an RRC inactive state or RRC idle state.

FIG. 12 illustrates a flowchart of a reference signal reception method 1200 from a plurality of cells of the electronic device 101, according to various embodiments.

According to various embodiments, in operation 1205, the electronic device 101 may receive DRX cycle information from a first cell (e.g., operation 1105 of FIG. 11).

According to various embodiments, in operation 1210, the electronic device 101 may receive SSB measurement timing information (e.g., operation 1110 of FIG. 11).

According to various embodiments, in operation 1215, the electronic device 101 may receive at least part of the first SSB 521 associated with the first cell (e.g., the first cell 420 of FIG. 5) and at least part of the second SSB 531 of the second cell (e.g., the second cell 430 of FIG. 5) at the period indicated by DRX cycle information, based on the SSB measurement timing information (e.g., SMTC)

According to an embodiment, when the difference (e.g., Td of FIG. 6) between the reception timing of the first SSB and the reception timing of the second SSB is less than a specified time duration, the electronic device 101 may receive at least part of the first SSB in the first measurement window (e.g., T1 of FIG. 5) and may receive at least part of the second SSB in the second measurement window (e.g., T2 of FIG. 5). For example, the length of each of the first measurement window and the second measurement window may not be greater than the window time duration (e.g., the SMTC duration 504 of FIG. 5) indicated by the SSB measurement window information; the interval between the first measurement window and the second measurement window may not be less than the period (e.g., the SMTC period 503 of FIG. 5) indicated by the SSB measurement period information.

According to an embodiment, the electronic device 101 may receive at least part of the first SSB 521 from the first cell 420 in the first measurement window (e.g., T1 of FIG. 5), using the first beamforming vector (e.g., beamforming vector corresponding to the first beam 511a of FIG. 5); the electronic device 101 may receive at least part of the second SSB 531 from the second cell 430 in the second measurement window, using the second beamforming vector (e.g., a beamforming vector corresponding to the second beam 511b of FIG. 5) associated with the second cell (e.g., the second cell 430 of FIG. 5). For example, the first beamforming vector and the second beamforming vector may be beamforming vectors different from each other.

According to various embodiments, the electronic device 101 may be configured to control at least one communication device to be in the second state during the time duration (e.g., the time duration corresponding to T1 and T2 of FIG. 5, T1 and T2' of FIGS. 6 and 8, and/or the symbol of SSB of FIG. 10) corresponding to the first measurement window and the second measurement window and to control at least one communication device to be in the first state having power consumption lower than the power consumption in the second state during the remaining time duration of the active duration other than the time duration corresponding to the first synchronization signal measurement window and the second synchronization signal measurement window.

According to various embodiments, the SSB measurement timing information may include SSB measurement window information (e.g., information of the SMTC duration 504 of FIG. 5) and SSB measurement period information (e.g., information of the SMTC period 503 of FIG. 5).

According to various embodiments, the SSB measurement timing information may further include offset information. The electronic device 101 may be configured to determine the starting point of each of the first SSB measurement window and the second SSB measurement window further based on the offset information According to various embodiments, each of the first SSB 521 and the second SSB 531 may include PSS, SSS, and PBCH.

According to various embodiments, the electronic device 101 may set the length of the second measurement window based on the reception power of at least part of the second synchronization signal block received in the first measurement window. For example, the electronic device 101 may set the starting point of the second measurement window based on the reception power of the second SSB.

According to various embodiments, when the reception power of at least part of the second SSB received in the first measurement window is less than a specified reception power, the electronic device 101 may skip the reception of the second SSB in the second measurement window, in the paging cycle to which the first measurement window belongs.

FIG. 13 illustrates a flowchart of a SS receiving method 1300 of the electronic device 101, according to various embodiments.

According to various embodiments, the electronic device 101 may include housing, an antenna array (e.g., the antenna 248 of FIG. 2) positioned inside the housing or including antenna elements formed in a part of the housing, a processor (e.g., the processor 120, the wireless communication module 192, and/or the third RFIC 226 of FIG. 2) electrically or operatively connected to the antenna array and configured to form a directional beam, using the antenna array, and a memory (e.g., the memory 130 of FIG. 1) operatively connected to the processor. For example, the memory may store instructions that, when executed, cause the processor to perform the operations of the electronic device 101 to be described.

According to various embodiments, in operation 1305, the electronic device 101 may select the serving cell (e.g., the first cell 420 of FIG. 5) through the directional beam (e.g., the first beam 511a of FIG. 5) formed in the first direction, during the first wake-up time. For example, the electronic device 101 may determine the combination of beams of the serving cell and the electronic device 101, by performing beam search.

According to various embodiments, in operation 1310, the electronic device 101 may receive time configuration information from the serving cell. For example, the time configuration information may include period information (e.g., SMTC period) for measuring the strength of a signal of each of the serving cell and a first neighbor cell (e.g., the second cell 430 of FIG. 5) associated with the serving cell.

According to various embodiments, in operation 1315, the electronic device 101 may set first periods of time (e.g., the first period of time 522 of FIG. 5) and second periods of time (e.g., the second period of time 532 of FIG. 5), which at least partly overlap with the first periods of time, based at least partly on the time configuration information. For example, the first period of time may be the period for receiving and measuring the signal of the first SSB 521 transmitted by the serving cell. For example, the second period of time may be the period for receiving and measuring the second SSB 531 transmitted by the first neighbor cell. According to an embodiment, the first period of time and the second period of time may at least partly overlap with each other.

According to various embodiments, in operation 1320, after the first wake-up time, the electronic device 101 may form the directional beam in the first direction during one of the first periods of time in the second wake-up time (e.g., T1 of FIG. 5) of the processor to measure the strength of the signal received from the serving cell.

According to various embodiments, in operation 1325, after the second wake-up time, the electronic device 101 may form the directional beam in the second direction different from the first direction during one of the second periods of time in the third wake-up time (e.g., T2 of FIG. 5) of the processor to measure the signal received from the first neighbor cell.

For example, the electronic device 101 may receive information associated with the serving cell or the first neighbor cell through at least one of SSB, master information block (MIB), or system information block (SIB) defined by 3GPP standard.

For example, the time configuration information may further include period information for measuring the strength of the signal of the second neighbor cell associated with the serving cell.

According to various embodiments, the electronic device 101 may set third periods of time, which do not overlap with the first periods of time, based at least partly on the time configuration information, may form the directional beam in the third direction different from the first direction during one of the third periods of time in the second wake-up time, and may measure the strength of the signal received from the second neighbor cell.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in this specification, the power consumption of an electronic device for cell measurement may be reduced According to various embodiments disclosed in this specification, the waiting time of the electronic device may increase due to the reduction of the power consumption.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
 a memory;
 at least one communication device configured to perform beamforming; and
 at least one processor operatively connected to the memory and the at least one communication device,
 wherein the at least one processor is configured to:
 receive discontinuous reception (DRX) cycle information from a first cell;
 receive synchronization signal block measurement timing information including synchronization signal block measurement window information and synchronization signal block measurement period information;
 receive at least part of a first synchronization signal block from the first cell and at least part of a second synchronization signal block from a second cell neighboring the first cell, at a period indicated by the DRX cycle information based on the synchronization signal block measurement timing information; and
 when a difference between reception timing of the first synchronization signal block and reception timing of the second synchronization signal block is less than a specified time duration, receive the at least part of the first synchronization signal block in a first measurement window and receive the at least part of the second synchronization signal block within a second measurement window following the first measurement window,
 wherein a length of each of the first measurement window and the second measurement window is not greater than a window time duration indicated by the synchronization signal block measurement window information, and
 wherein an interval between the first measurement window and the second measurement window is not less than a period indicated by the synchronization signal block measurement period information.

2. The electronic device of claim 1, wherein the at least one processor is configured to:
 receive the at least part of the first synchronization signal block in the first measurement window, using a first beamforming vector associated with the first cell; and
 receive the at least part of the second synchronization signal block in the second measurement window, using a second beamforming vector associated with the second cell,
 wherein the first beamforming vector and the second beamforming vector are different from each other.

3. The electronic device of claim 1, wherein the at least one processor is configured to:
 control the at least one communication device to be in a first state during a time duration corresponding to the first measurement window and the second measurement window; and
 control the at least one communication device to be in the first state having power consumption lower than power consumption in a second state during a remaining time duration of the period indicated by the DRX cycle information other than the time duration corresponding to the first measurement window and the second measurement window.

4. The electronic device of claim 1, wherein the synchronization signal block measurement timing information further includes offset information, and
 wherein the at least one processor is configured to:
 determine a starting point of each of the first measurement window and the second measurement window further based on the offset information.

5. The electronic device of claim 1, wherein the synchronization signal block measurement timing information includes synchronization signal block (SSB)-based radio resource management (RRM) measurement timing configuration (SMTC).

6. The electronic device of claim 1, wherein each of the first synchronization signal block and the second synchronization signal block includes a primary synchronization signal (PSS), a secondary synchronization signal (SSS), and a physical broadcasting channel (PBCH).

7. The electronic device of claim 1, wherein the electronic device is in a radio resource control (RRC) inactive state or an RRC idle state.

8. The electronic device of claim 1, wherein the at least one processor is configured to:
 set the length of the second measurement window based on a reception power of the at least part of the second synchronization signal block received in the first measurement window.

9. The electronic device of claim 1, wherein the at least one processor is configured to:
 when a reception power of the at least part of the second synchronization signal block received in the first measurement window is less than a specified reception power, skip reception of the second synchronization signal block in the second measurement window, in a paging cycle to which the first measurement window belongs.

10. An electronic device comprising:
 a housing;
 an antenna array positioned inside the housing or including antenna elements formed in a part of the housing;
 a processor electrically or operatively connected to the antenna array and configured to form a directional beam, using the antenna array; and
 a memory operatively connected to the processor, wherein the memory stores instructions that, when executed, cause the processor to:
 select a serving cell through a directional beam formed in a first direction, during a first wake-up time of the processor;
 receive time configuration information including a period for measuring strength of a signal of each of the serving cell and a first neighbor cell associated with the serving cell, from the serving cell;
 set first periods of time for measurement of a first synchronization signal block transmitted by the serving cell and second periods of time, which at least partly overlap with the first periods of time, for measurement of a second synchronization signal block transmitted by the first neighbor cell, based at least partly on the time configuration information;
 after the first wake-up time, form a directional beam in the first direction during one of the first periods of time in a second wake-up time of the processor to measure strength of a signal received from the serving cell; and after the second wake-up time, form a directional beam in a second direction different from the first direction during one of the second periods of time in a third wake-up time of the processor to measure a signal received from the first neighbor cell.

11. The electronic device of claim 10, wherein the instructions that, when executed, cause the processor to:
receive information associated with the serving cell or the first neighbor cell through at least one of a synchronization signal block (SSB), a master information block (MIB), or a system information block (SIB) defined by $3^{rd}$ generation partnership project (3GPP) standard.

12. The electronic device of claim 10, wherein the time configuration information includes synchronization signal block (SSB)-based radio resource management (RRM) measurement timing configuration (SMTC) defined by $3^{rd}$ generation partnership project (3GPP) standard.

13. The electronic device of claim 10, wherein the time configuration information further includes a period for measuring strength of a signal of a second neighbor cell associated with the serving cell.

14. The electronic device of claim 13, wherein the instructions that, when executed, cause the processor to:
set third periods of time, which do not overlap with the first periods of time, based at least partly on the time configuration information; and
form a directional beam in a third direction different from the first direction during one of the third periods of time in the second wake-up time to measure strength of a signal received from the second neighbor cell.

15. A beam tracking method of an electronic device, the method comprising:
receiving discontinuous reception (DRX) cycle information from a first cell;
receiving synchronization signal block measurement timing information including synchronization signal block measurement window information and synchronization signal block measurement period information; and
receiving at least part of a first synchronization signal block from the first cell and at least part of a second synchronization signal block from a second cell neighboring the first cell, at a period indicated by the DRX cycle information based on the synchronization signal block measurement timing information, using a communication circuit of the electronic device,
wherein the receiving of the at least part using the communication circuit of the electronic device includes:
when a difference between reception timing of the first synchronization signal block and reception timing of the second synchronization signal block is less than a specified time duration, receiving at least part of the first synchronization signal block in a first measurement window and receiving at least part of the second synchronization signal block within a second measurement window,
wherein each of the first measurement window and the second measurement window is less than a window time duration indicated by the synchronization signal block measurement window information, and
wherein an interval between the first measurement window and the second measurement window is not less than a period indicated by the synchronization signal block measurement period information.

16. The method of claim 15, wherein the receiving of the at least part using the communication circuit of the electronic device includes:
receiving the at least part of the first synchronization signal block in the first measurement window, using a first beamforming vector associated with the first cell; and
receiving the at least part of the second synchronization signal block in the second measurement window, using a second beamforming vector associated with the second cell,
wherein the first beamforming vector and the second beamforming vector are different from each other.

17. The method of claim 15, further comprising:
controlling the electronic device to be in a first state during a time duration corresponding to the first measurement window and the second measurement window; and
controlling the electronic device to be in the first state having power consumption lower than power consumption in a second state during a remaining time duration of a period indicated by the DRX cycle information other than the time duration corresponding to the first measurement window and the second measurement window.

18. The method of claim 15, wherein the synchronization signal block measurement timing information includes synchronization signal block (SSB)-based radio resource management (RRM) measurement timing configuration (SMTC).

19. The method of claim 15, wherein the synchronization signal block measurement timing information further includes offset information,
further comprising:
determining a starting point of each of the first measurement window and the second measurement window further based on the offset information.

20. The method of claim 15, wherein each of the first synchronization signal block and the second synchronization signal block includes a primary synchronization signal (PSS), a secondary synchronization signal (SSS), and a physical broadcasting channel (PBCH).

* * * * *